United States Patent
Kuwahara

(10) Patent No.: US 8,406,145 B2
(45) Date of Patent: Mar. 26, 2013

(54) RADIO BASE STATION APPARATUS

(75) Inventor: Mikio Kuwahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 396 days.

(21) Appl. No.: 12/776,517

(22) Filed: May 10, 2010

(65) Prior Publication Data

US 2010/0290413 A1 Nov. 18, 2010

(30) Foreign Application Priority Data

May 14, 2009 (JP) .................................. 2009-117521

(51) Int. Cl.
*H04W 72/00* (2009.01)
(52) U.S. Cl. ........ 370/252; 370/329; 370/341; 455/445; 455/450; 455/509
(58) Field of Classification Search .................. None
See application file for complete search history.

(56) References Cited

U.S. PATENT DOCUMENTS

| | | | | |
|---|---|---|---|---|
| 2009/0069023 | A1* | 3/2009 | Ahn et al. | 455/450 |
| 2010/0150079 | A1* | 6/2010 | Maltsev et al. | 370/329 |
| 2010/0232534 | A1* | 9/2010 | Lee et al. | 375/267 |

FOREIGN PATENT DOCUMENTS

| JP | 8-205227 A | 8/1996 |
|---|---|---|
| JP | 2007-235647 A | 9/2007 |

* cited by examiner

*Primary Examiner* — Chi H. Pham
*Assistant Examiner* — Shick Hom
(74) *Attorney, Agent, or Firm* — Mattingly & Malur, PC

(57) ABSTRACT

A DSP checks the traffic on a control channel transmitted to each terminal, and obtains a total of traffic on the control channel for each remote radio unit. The DSP transforms a correlation matrix calculated in an analysis section to a partial orthogonal matrix subjected to partial orthogonalization. The DSP divides one or more remote radio units into the groups in accordance with the sequence of rows or columns of the partial orthogonal matrix so that the total traffic for each group in which the total of traffic is added for one or more remote radio units within the group may be less than or equal to a predetermined threshold, and stores the identification number of the remote radio unit for each group in a memory.

18 Claims, 22 Drawing Sheets

The size of circle indicates the traffic amount of control information.
The length of arrow indicates that the correlation is low.

$$\mathbf{R} = \begin{bmatrix} 10 & 1 & 1 & 8 \\ 1 & 4 & 2 & 1 \\ 1 & 2 & 3 & 2 \\ 8 & 1 & 2 & 10 \end{bmatrix} \implies \mathbf{R'} = \begin{bmatrix} 10 & 8 & 1 & 1 \\ 8 & 10 & 2 & 1 \\ 1 & 2 & 3 & 2 \\ 1 & 1 & 2 & 4 \end{bmatrix} \begin{matrix} \leftarrow 101 \\ \leftarrow 104 \\ \leftarrow 103 \\ \leftarrow 102 \end{matrix}$$

Elements of Matrix after transformation show correspondence to the remote radio units 101~104

FIG. 11(C)

$$R = \begin{bmatrix} 10 & 1 & 1 & 8 \\ 1 & 4 & 2 & 1 \\ 1 & 2 & 3 & 2 \\ 8 & 1 & 2 & 10 \end{bmatrix}$$

Step 1
Replace second row and fourth row $$R = \begin{bmatrix} 10 & 1 & 1 & 8 \\ 8 & 1 & 2 & 10 \\ 1 & 2 & 3 & 2 \\ 1 & 4 & 2 & 1 \end{bmatrix}$$

Step 2
Replace second column and fourth column $$R' = \begin{bmatrix} 10 & 8 & 1 & 1 \\ 8 & 10 & 2 & 1 \\ 1 & 2 & 3 & 2 \\ 1 & 1 & 2 & 4 \end{bmatrix}$$

FIG. 17

RADIO BASE STATION APPARATUS

CLAIM OF PRIORITY

The present application claims priority from Japanese patent application JP 2009-117521 filed on May 14, 2009, the content of which is hereby incorporated by reference into this application.

BACKGROUND OF THE INVENTION

1. Field of the Invention

The present invention relates to a radio base station apparatus, and more particularly to a radio base station apparatus that embodies means for terminating a plurality of antenna groups and automatically optimizing the resource allocation.

2. Description of the Related Art

In a cellar type radio communication system, plural sets of antennas are dispersedly arranged over a service area. A terminal is connected to one set of antennas in the most excellent radio wave situation. The terminal can make the optimal communication while moving freely within the service area by changing the antenna to be connected along with the movement of the terminal to maintain the excellent communication state. The area covered by one set of antennas is called a cell. In the radio communication system, the information to be transmitted is divided into the user data and the control information. The user data is the information itself to be transmitted or received by wireless. The control information is the management information or the like for transmitting or receiving the user data, including the scheduling result for allocating the radio resource, for example. The terminal judges the packet to be transmitted to itself by referring to this scheduling information. Or the terminal grasps the resource permitted to use for itself to communicate with the base station.

With the prior arts, each cell was defined bound with one set of antennas. That is, the same control information was transmitted from an aggregate of one or more antennas installed at the same place, and the different control information was transmitted from an antenna or an aggregate of antennas installed at the distant place from there, in which the terminal supported by each antenna was different. In initially installing the radio system, the arrangement design of antenna was made based on the traffic forecast of a target area. In redesigning the antenna arrangement due to increased traffic, the subsequent increased or decreased traffic was assessed, and the arrangement of a newly added base station (antenna for constructing the new cell) was designed based on the information.

For a base station apparatus of aggregate type that is composed of plural sets of antennas, a technique for providing the economic base station corresponding to the load distribution in which a plurality of child stations are connected via the optical fiber, and the communication devices smaller in the number than the antennas are put to heavy use was disclosed in JP-A-2007-235647 or JP-A-8-205227. However, another cell was constructed in which the different control information was transmitted from the antennas installed at the same place and the antennas installed at the distant place, as described above.

SUMMARY OF THE INVENTION

In a system in which a plurality of antennas is dispersedly arranged, the cell in which the same control information is transmitted was defined bound with the antenna.

FIG. 13 is a view showing one example of cell organization in the radio system of the conventional example. For example, in a network configuration of the conventional example as shown in FIG. 13, a plurality of base stations (901 to 905) are linked to a line collector (or a switch or the like) 900 of the network, in which each base station constructs a cell (911 to 915) that becomes a fixed or semi-fixed radio communicable area. In such a conventional example, the cell design is made based on the forecast of traffic or interference and the antenna (i.e., base station apparatus) is arranged. Once arranged, the cell radius can be more or less changed by controlling the sending power, but there was not high flexibility.

In such a network configuration, when the traffic distribution was greatly changed with the increased number of users or the appearance of a new application, it was difficult to take some measure. Therefore, it was required to remake the radio design by increasing or decreasing the number of base stations according to the traffic, or changing the arrangement, often resulting in great operation costs.

A centralized base station terminating a plurality of antennas has been proposed in the standardization such as the third generation partnership project (3GPP). However, a different control channel is transmitted from each antenna and operates as a different cell. With this configuration, the plurality of antennas can not be operated as if they were one cell. Also, there was no autonomous control mechanism for keeping the cell organization optimal at any time through the automatic judgment by grasping the merits and demerits in the case where the plurality of antennas are integrated and operated as if they were one cell and the case where they are operated as a plurality of cells.

Also, an operation for creating a neighbor list or the like was required after the antenna was arranged, in which various kinds of settings decided by the antenna arrangement had to be made manually. Such a human work not only increases the construction cost, but also causes a human mistake.

The invention has been achieved in the light of the above-mentioned problems, and it is an object of the invention to provide a radio base station apparatus having a mechanism for reconfiguring the cells properly in consideration of the traffic of control information, the traffic of user data, and/or the interference conditions in an area covered by the base station apparatus connected to plural sets of remote radio units.

In order to accomplish the above objects, there is provided a radio base station apparatus, in which a group is composed of apart or all of a plurality of remote radio units having antennas, comprising a control information transmitting section for transmitting the same control information to that group, a user information transmitting section for transmitting the user information for a specific user to each remote radio unit, and management means for periodically updating the grouping from a statistic regarding the traffic of control information as well as the received analysis result by receiving the known information transmitted by any user in the plurality of remote radio units.

Also, there is provided the radio base station apparatus in which the management means compares a total traffic of the control information transmitted by each remote radio unit with a threshold value determined according to the radio system, and periodically updates the grouping based on the comparison result.

Further, there is provided the radio base station apparatus in which the management means has a procedure of receiving the known information transmitted by the same user in the plurality of remote radio units, obtaining the correlation between the plurality of remote radio units from the received information, and performing the grouping with reference to the correlation.

Further, there is provided the radio base station apparatus that performs the integrated scheduling for transmitting the same user data cooperatively from the plurality of remote radio units within the same group.

Further, there is provided the radio base station apparatus that performs the integrated scheduling to disable the transmission with a specific resource to reduce the interference in cooperation with the other remote radio unit from the specific remote radio unit within the same group.

Further, there is provided the radio base station apparatus wherein the grouping is performed by update in units of time or day, in which the update time occurs when the traffic of the concerned antenna becomes zero.

Further, there is provided the radio base station apparatus that selects the resource candidate for use in the communication with the terminal, employing the correlation information created by the management means.

Further, there is provided the radio base station apparatus that has terminal detection means for detecting the known information from the terminal in the limited range of remote radio unit, employing the correlation information created by the management means.

Further, there is provided the radio base station apparatus wherein the management means receives the known information transmitted by the same user in the plurality of remote radio units, and obtains each received power from the received information, and a scheduler for deciding the resource allocation judges the multiplicity of the user with reference to the received power to perform the resource allocation.

According to the first solving means of the solving invention, there is provided a radio base station apparatus, having one or more groups including part or all of a plurality of remote radio units having one or more antennas, for transmitting a down link channel signal including the control information that is the same for each group, a reference signal specifying a radio terminal, and the user data to any radio terminal via the plurality of remote radio units, and receiving an up link channel signal from any radio terminal via the plurality of remote radio units, the radio base station comprising:

an analysis section for calculating a correlation matrix R representing the degree of interference between each of two remote radio units based on a received signal; and a processing section for performing the grouping;

wherein the processing section checks the traffic on a control channel transmitted to each terminal, and obtains the total traffic Ti on the control channel for each remote radio unit i;

the processing section transforms the correlation matrix R calculated in the analysis section to a partial orthogonal matrix R' subjected to partial orthogonalization;

the processing section divides the remote radio units into the groups including the one or more remote radio units in accordance with the partial orthogonal matrix R'; and the processing section stores the identification number of the one or more remote radio units for each group in a memory, for performing the grouping.

According to the second solving means of the solving invention, there is provided a radio base station apparatus, having one or more groups including part or all of a plurality of remote radio units having one or more antennas, for transmitting a down link channel signal including the control information that is the same for each group, a reference signal specifying a radio terminal, and the user data to any radio terminal via the plurality of remote radio units, and receiving an up link channel signal from any radio terminals via the plurality of remote radio units, the radio base station comprising:

an analysis section for calculating a correlation matrix R representing the degree of interference between each of two remote radio units based on a received signal; and a processing section for performing the grouping;

wherein the processing section checks the traffic on a control channel transmitted to each terminal, and obtains the total traffic Ti on the control channel for each remote radio unit i;

the processing section transforms the correlation matrix R calculated in the analysis section to a partial orthogonal matrix R' subjected to partial orthogonalization;

the processing section divides the remote radio units into the groups including the one or more remote radio units in accordance with the sequence of rows or columns of the partial orthogonal matrix R' so that the total traffic for each group in which the total of traffic is added for one or more remote radio units within the group may be less than or equal to a predetermined threshold; and the processing section stores the identification number of the one or more remote radio units for each group in a memory, for performing the grouping.

According to the present invention, it is possible to provide a radio base station apparatus having a mechanism for reconfiguring the cells properly in consideration of the traffic of control information, the traffic of user data, and/or the interference conditions in an area covered by the base station apparatus connected to plural sets of remote radio units. The present invention enables to achieve cell design with high flexibility and considerable efficiency.

BRIEF DESCRIPTION OF THE DRAWINGS

FIG. 11C is an explanatory view showing a correlation matrix (before transformation, after transformation).

FIG. 17 is an explanatory view for the partial orthogonalization of the correlation matrix.

DETAILED DESCRIPTION OF THE PREFERRED EMBODIMENTS

1. Radio System
1-1 Outline of System

In designing a cellar type radio communication cell, each cell was defined bound with one set of antennas in the prior arts. That is, the same control information was transmitted from an aggregate of plural antennas installed at one or the same place, and the different control information was transmitted from an antenna or an aggregate of antennas installed at the distant place from there, in which the different terminal was supported by each antenna. In initially installing a radio system, the antenna arrangement was designed based on the traffic forecast of a target area. When the antenna arrangement was redesigned due to the increasing traffic, the following increased or decreased traffic was assessed, and the arrangement of a newly added base station (antenna for constructing the new cell) was designed based on the assessment.

Figure 13:
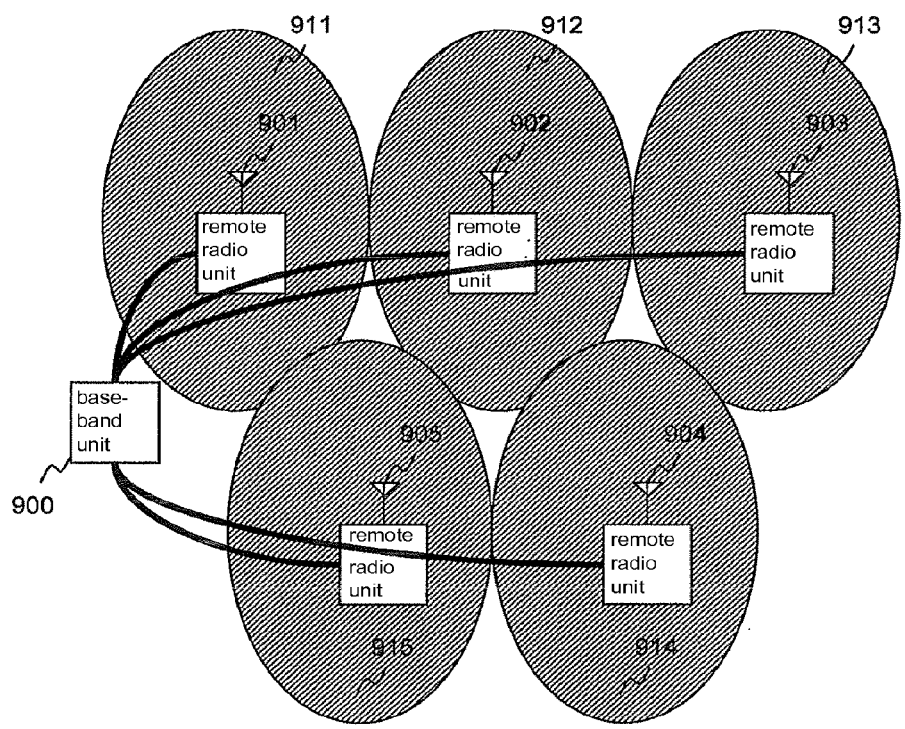
FIG. 13 is a view showing one example of the cell organization in the radio system of the conventional example.

For example, in a network configuration of the conventional example as shown in FIG. 13, a plurality of base stations (901 to 905) were linked to a line concentrator (or a switch or the like) of the network, in which each base station composed a cell (911 to 915) in a radio communicable area which is fixed or semi-fixed. In such conventional example, the cell design is made and the antennas (base stations 901 to 905 in FIG. 13) are arranged, based on the forecast of traffic or interference, as already described. By controlling the sending power, the cell radius could be more or less changed, but there was not high flexibility. Therefore, it was required to remake the wireless design such as increasing or decreasing the number of base stations or changing the arrangement depending on the traffic, often resulting in the great operation costs.

Also, an operation for creating a neighbor list or the like was required after the antenna was arranged, in which various kinds of settings decided by the antenna arrangement had to be made manually. Such a human work not only increases the construction cost, but also causes a human mistake. In the present invention and this embodiment, means for solving the above-mentioned problems is provided.

An embodiment of the invention will be described below in detail with reference to FIGS. 1, 2, 4, 5, 6, 7, 8, 9, 10, 11, 12, 14, 15 and 16.

Figure 1:
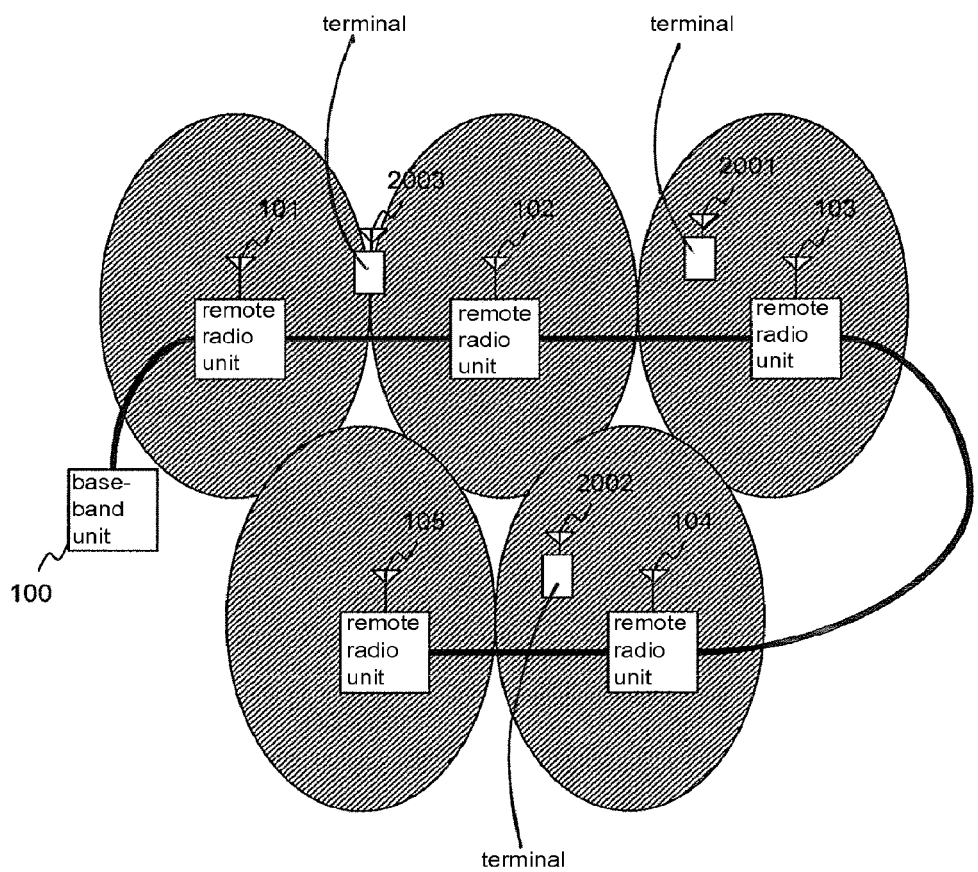
FIG. 1 is a view showing one example of the cell organization in a radio system according to an embodiment of the invention.
Figure 2:
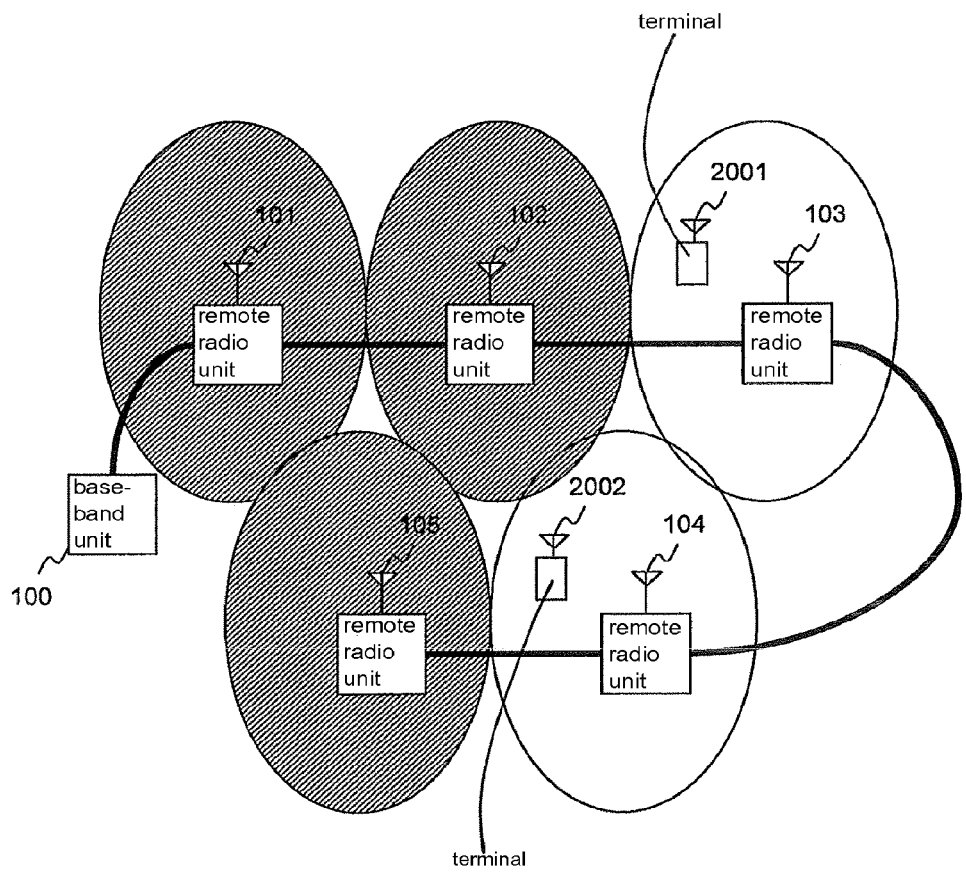
FIG. 2 is a view showing one example of the cell organization in the radio system according to this embodiment.
Figure 10:
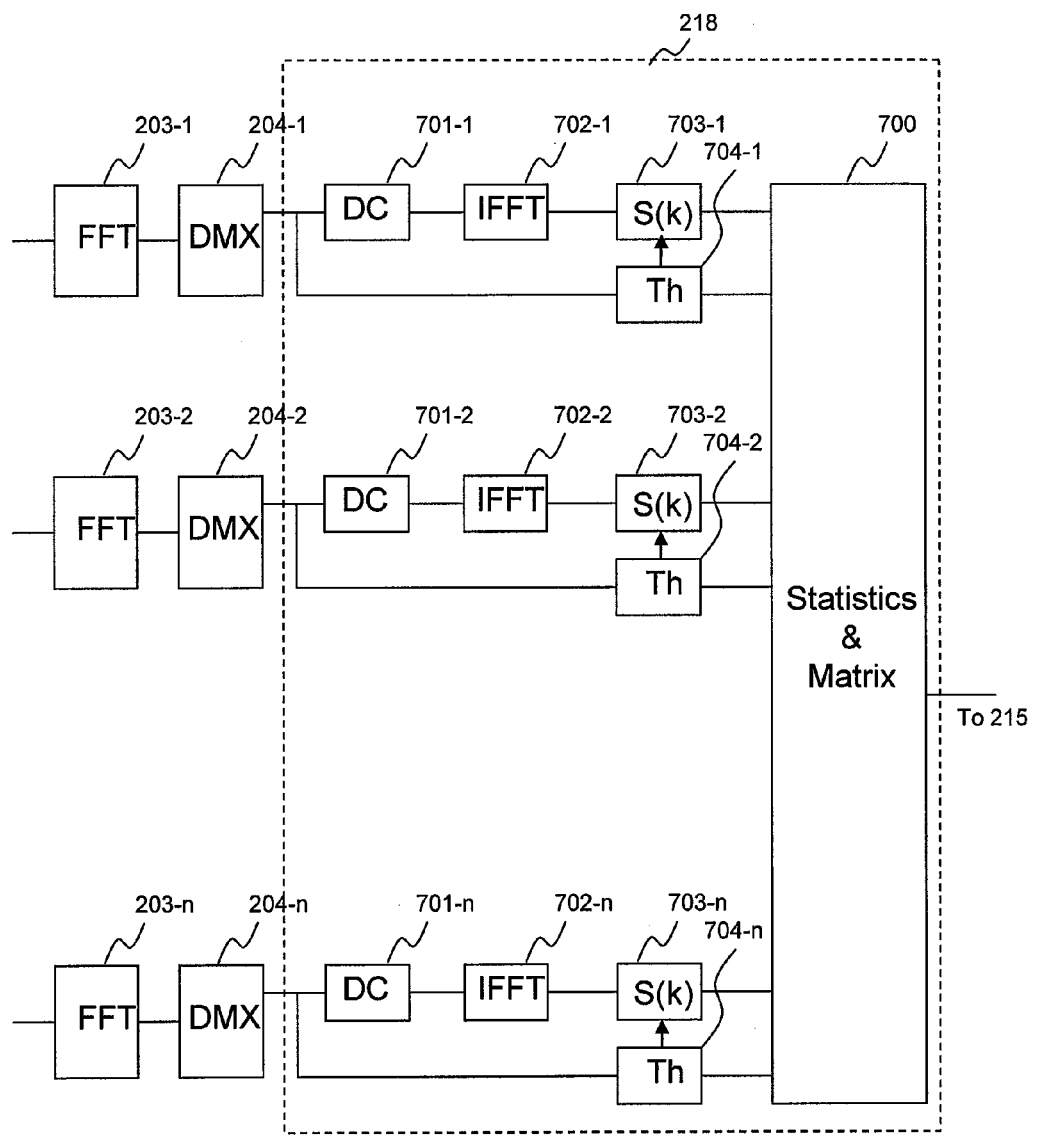
FIG. 10 is a configuration diagram of an analysis section 218 in the base band unit according to this embodiment.

FIGS. 1 and 2 show one example of a cell organized according to a first embodiment. Herein, the apparatuses 101 to 105 are called a remote radio unit (Remote Radio Head (RRH) or Remote Radio Equipment (RRE)). FIG. 5 shows the outline of the functions (as detailed later). This unit is linked to a base band unit 100 (or BBU: Base-Band Unit) via the optical fiber or the like. A core of the signal processing is laid in the base band unit 100 as shown with the functional blocks in FIG. 4 (as detailed later). FIG. 10 shows the functions of an analysis section (SRD) 218 (as detailed later).

In an example of FIG. 1, five remote radio units 101 to 105 are linked to one base band unit 100. Each remote radio unit originates or receives the radio wave to construct a cover area (represented by an ellipse in the figure) in its surroundings. Each remote unit has one or more antennas capable of transmitting or receiving the signals such as a Single-Input Single-Output (SISO), a Single-Input Multi-Output (SIMO), a Multi-Input Single-Output (MISO), and a Multi-Input Multi-Output (MIMO).

The information transmitted from each antenna can be decomposed of the control information and user data. The user data is the information itself desired to be transmitted or received by wireless. The control information is the management information for transmitting or receiving the user data, including the scheduling result for allocating the radio resource, for example. A terminal can judge a packet transmitted to the concerned terminal by referring to the scheduling information. Or the terminal can grasp the resources permitted for use to communicate with the base station.

Also in an example of FIG. 2, like FIG. 1, five remote radio units 101 to 105 are linked to one base band unit. Each remote radio unit originates or receives the radio wave to construct a cover area (represented by an ellipse in the figure) in its surroundings. In FIG. 2, the cover area represented by the ellipse is colored in two kinds (white and gray (hatched part)). Herein, it is indicated that the same control channel is transmitted to the area of the same color. That is, in the organization of FIG. 1, all of the five areas are represented in the same color and the same control channel is transmitted to all of the areas. On the other hand, in the organization of FIG. 2, the five areas are divided into two groups, group 1 (101, 102, 105) and group 2 (103, 104). The same control information is transmitted from each antenna within the same group, and the different control information is transmitted from the antenna in the different group. Transmitting the same control information as referred to herein may also include a case of diversity transmitting the same information using a Cyclic Delay Diversity (CDD) or a Space Time Coding (STC).

A difference between the case of transmitting the same control channel in all of the areas (FIG. 1) and the case of transmitting the different control channel (FIG. 2) will be discussed below.

1-2. Case of Transmitting the Same Control Channel in all of the Areas: Case of FIG. 1

In the case where the same control channel is transmitted in all of the cover areas, the terminal can receive the common control information, wherever the terminal is located within the cover area, as shown in FIG. 1. Accordingly, no handover occurs, even if the terminal freely moves within the five cover areas, as shown in FIG. 1.

A reference signal (or cell specific reference signal) for cell identification transmitted from the different remote radio units (e.g., 101 and 104) is also common. Therefore, the terminal can not identify the remote radio units 101 and 104.

The control signal and the cell specific reference signal transmitted from the different remote radio units are synchronized in space and received by the terminal. The terminal estimates the propagation path undergone by the control signal for detection, using the cell specific reference signal, and demodulates and decodes the control signal. The information transmitted from the different remote radio units are received undergoing the different propagation paths and different propagation delays, whereby a path diversity effect (or transmission diversity effect) can be expected. Accordingly, the terminal even at the boundary between the remote radio units can spatially synthesize and receive the signals transmitted from the plural remote radio units, in which the reception at high sensitivity is enabled.

There are three methods for transmitting the user data, which will be described below as a first transmitting method, a second transmitting method and a third transmitting method.

The first transmitting method will be described below. The first transmitting method involves transmitting the information of different user data from each remote radio unit to the different terminal, and is effective especially when the terminal is located near the remote radio unit. For example, a terminal (radio terminal) 2001 is located in the vicinity of a remote radio unit 103 in FIG. 1. Also, a terminal (radio terminal) 2002 is located in the vicinity of a remote radio unit 104. The resource with the same frequency and the same time is allocated to these two terminals. The user data transmitted from the remote radio unit 103 is directed to the terminal 2001, and the user data transmitted from the remote radio unit 104 is directed to the terminal 2002. The signal transmitted from each remote radio unit has a dominant term of the signal from the neighboring remote radio unit, with less interference due to the signals transmitted from the other remote radio units. In this way, if the radio waves transmitted from the remote radio units dispersedly arranged do not interfere with each other, the spatial multiplexing of transmitting the different information to the different terminals at the same time is enabled for the user data.

In detecting the user data transmitted individually to each terminal, the propagation path estimation with the cell specific reference signal as previously described can not be employed. This reference signal can not be separated again after being synthesized in space, because each remote radio unit transmits the common signal. Therefore, the terminal can not separate the reference signal transmitted from each remote radio unit, and the propagation path undergone by the user data can not be correctly estimated. Therefore, an individual terminal specific reference signal corresponding to the user data is transmitted from each remote radio unit. Unlike the cell specific reference signal, each remote radio unit adds its own terminal specific reference signal, and transmits the user data. Therefore, the terminal can separate the individual reference signal, and can make the same propagation path estimation as for the user data.

The second transmitting method will be described below. The second transmitting method is effective when the terminal is located at the boundary between the cover areas made by two remote radio units such as the terminal 2003 in FIG. 1. In transmitting the user data with the second transmitting method, in the same way as transmitting the control information, the two remote radio units 101 and 102 operate as the transmission diversity to transmit the common user data information to the terminal (radio terminal) 2003. A plurality of radio resources are consumed at the same time because the signals are transmitted from a plurality of remote radio units, whereby the efficiency is degraded.

In detecting the user data, the terminal specific reference signal as previously mentioned is employed. In the second transmitting method, the terminal specific reference signal is also transmitted in the same way as the user data. That is, the reference signal is arranged in a part of the resource at the frequency and the time for which the user data is transmitted from the two remote radio units 101 and 102. The reference signal is also synthesized in space, like the user data. Therefore, the reference signal can undergo the same propagation path as the user data, and the propagation path estimation necessary for detecting the user data can be made.

The third transmitting method will be described below. The third transmitting method, like the second transmitting method, is effective when the terminal is located at the boundary between the cover areas made by two remote radio units such as terminal 2003 in FIG. 1. In transmitting the user data with the third transmitting method, one of the remote radio units only transmits the signal, and the other remote radio unit does not transmit the signal with the resource for the same time and the same frequency allocated to the terminal at the boundary of the cover area on the one side, whereby the interference in the communication is eliminated. The other remote radio unit equivalently performs the communication consuming the multiple resources, because it can not transmit the signal with the concerned resource. Therefore, the efficiency is lower than the first transmitting method.

In detecting the user data, the terminal specific reference signal as previously mentioned is employed. In the third transmitting method, the terminal specific reference signal is transmitted in the same way as the user data. That is, if there are two remote radio units 101 and 102, the user data is transmitted only from any one of the remote radio units, and the reference signal is arranged in a part of the same resource as for the user data. Since the reference signal can undergo the same propagation path as the user data, the propagation path estimation necessary for detecting the user data can be made.

If the plural remote radio units cooperate to transmit the user data as in the second and third transmitting methods, the high throughput can be provided even at the boundary of the cover area. The cooperative communication is easily practiced in this embodiment, because the base band unit 100 performs the signal processing for the plural remote radio units 101 to 105 collectively and plural cover areas become an integral area through which the same control information is flowed, as shown in FIG. 1. Also, in the integral cover area (sum of the five cover areas in FIG. 1) in which the plural cover areas are integrated, the common control channel and the common cell specific reference signal can be received, whereby the terminal can obtain the high throughput under the command of the plural remote radio units without being aware of the boundary of the cover area.

However, there is a problem with the organization of FIG. 1. It is the capacity of the control channel. In exchanging the communication packet with the terminal, it is required to make the scheduling for deciding which resource is allocated to which terminal. The base band unit 100 contains a Digital Signal Processor (DSP) for scheduling. The result of scheduling performed by the DSP is notified to the terminal through the control channel as the control information. In the configuration of implementing the spatial multiplexing in which there are five areas and each area can transmit different user data, as shown in FIG. 1, the scheduling information of nearly five times more resources is generated than the ordinary configuration in which there is only one area. Therefore, the control information for notifying the scheduling result to the terminal needs the capacity nearly five times greater. However, the control information is not individual for each remote radio unit, as previously described, but all of the remote radio units transmit the control information common to the plural areas. Accordingly, there is no effect of spatial multiplexing, and the capacity of control information may not be improved greatly. Therefore, the capacity of the control channel to transmit the scheduling result is insufficient even if there is a margin in the resource for the user data, whereby there are some instances that the capacity of user data can not be increased.

1-3. Case of Transmitting the Different Control Channel: Case of FIG. 2

In the case where a plurality of antennas transmit the same control channel only in part, it is necessary to transmit only the scheduling information related to the terminal managed in the cover areas (or group of the remote radio units, the hatched cover areas or white cover areas in FIG. 2) where the same control information is transmitted. Accordingly, the multiplicity in the spatial multiplexing is limited. As a result, the amount of scheduling result to be notified to the terminal is not increased, whereby the possibility that the capacity of the control channel becomes a bottleneck is reduced.

On the other hand, since the area through which the same control information is flowed is restricted, the terminal must make the handover frequently.

Figure 15:
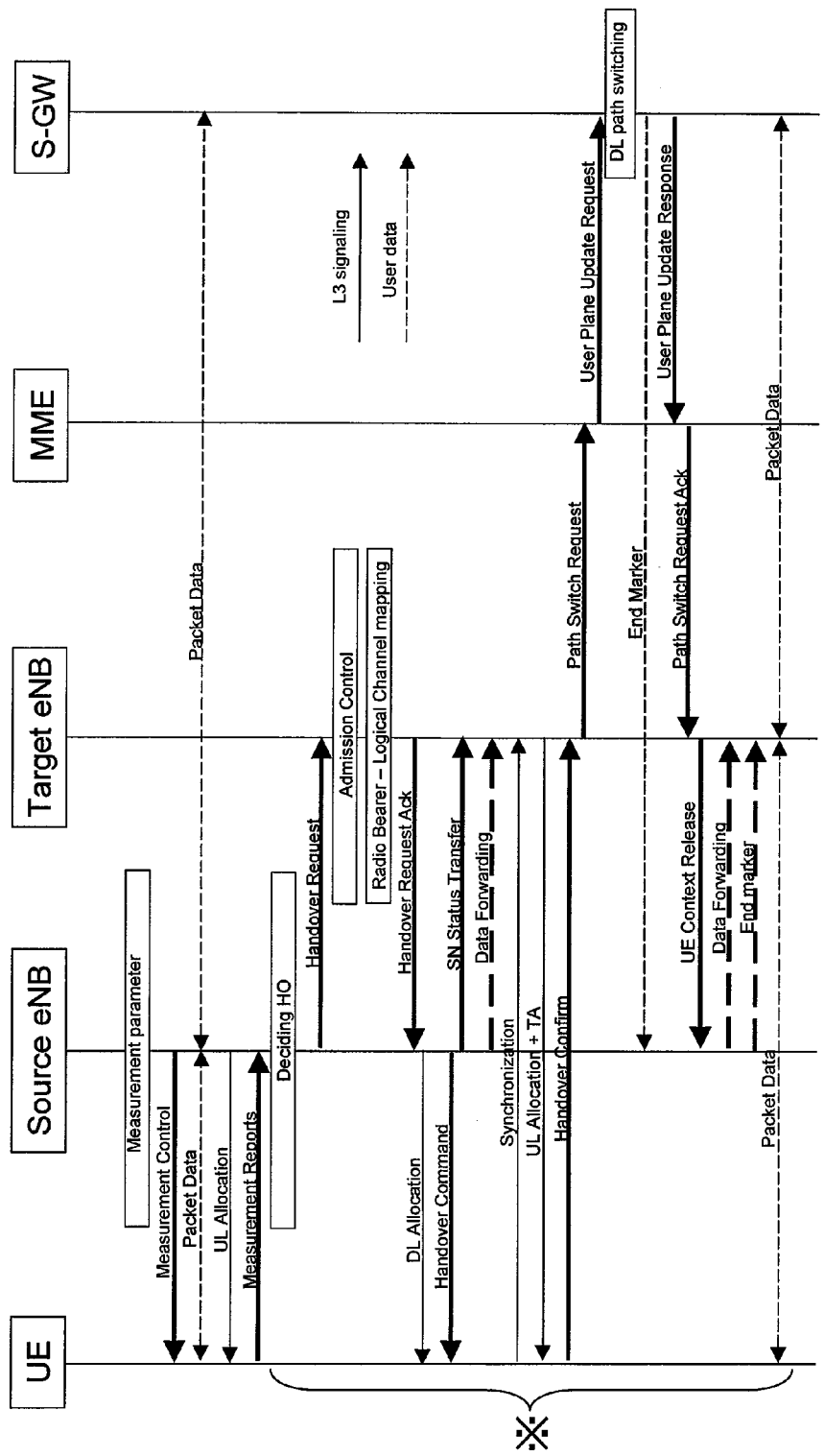
FIG. 15 is a sequence chart showing a handover procedure in a Long Term Evolution (LTE).

FIG. 15 is a chart showing a handover procedure in the Long Term Evolution (LTE). The handover procedure of the LTE in the sequence chart of FIG. 15 has been discussed in the standardization association 3GPP. Herein, UE denotes a terminal, eNB denotes a base station apparatus, NME denotes an entity of movement management, and S-GW denotes a serving gateway. The arrow indicates the message that each node transmits to another node. As will be seen from FIG. 15, a procedure as indicated by ✖ sign is required during a period from the time when the serving base station (Serving eNB) decides the handover to the time when it is transferred to the target base station. In the present state of things, the processing time is required to be, for example, from about several ms to several tens ms (expression 1), and the radio resource for handover is needed such as a random access procedure for connecting to the new base station, whereby it is desired that the occurrence of handover is suppressed as much as possible. Therefore, the threshold in deciding the handover is ordinarily provided with a hysteresis.

Figure 16:
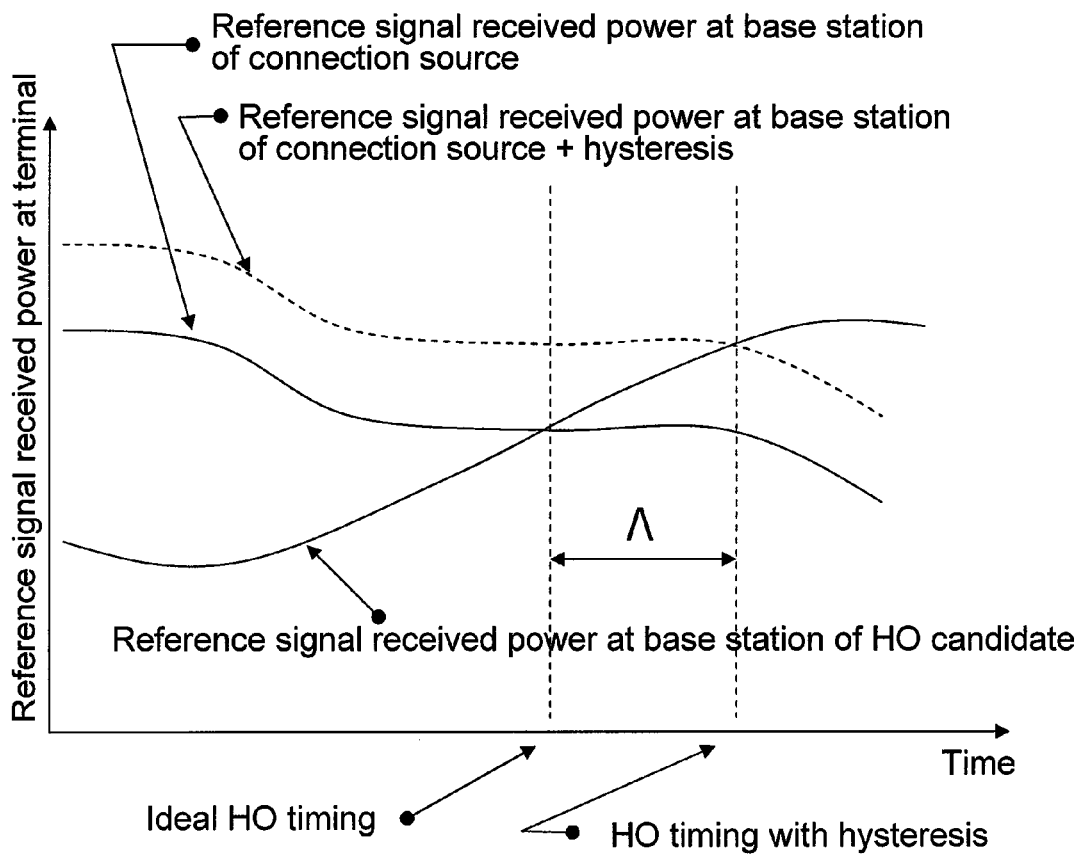
FIG. 16 is a view for explaining the occurrence of a waste (overhead) due to hysteresis in the handover.

FIG. 16 is a view for explaining the occurrence of a waste (overhead) due to hysteresis in the handover. FIG. 16 shows a concept of received power for the reference signal during the handover where there is hysteresis. Two curves of the solid line represent the received power of the reference signal from the base station of connection source and the base station of handover candidate. A curve of the broken line represents the offset to the received power of the reference signal from the base station of connection source to provide the hysteresis. Ideally, the handover time is 0, and it is desirable that the handover is performed at the point where the received powers of the reference signals from the base station of connection source and the base station of handover candidate cross. However, since the handover has the procedure and takes a long time, as previously described, the handover between the connection source and the connection destination is repeated, often hindering the communication, if there is no hysteresis. Accordingly, the offset is provided to suppress the handover until the handover timing where there is hysteresis as shown in the figure. Since the reference signal of handover destination has a higher received power than the reference signal of handover source in the time ($\Lambda$ in FIG. 16) between the ideal handover timing and the handover timing with hysteresis, the communication with the connection source is maintained, although the more excellent communication can be expected by handover. Therefore, in some cases, a deterioration factor regarding $\Lambda$ may occur. In the configuration as shown in FIG. 1, the antenna for connection changes, but the antennas are only switched within the same cell, whereby it is not necessary to perform the handover procedure regarding an upper level layer. Therefore, the problem of lower efficiency does not occur.

1-4. Comparison between FIG. 1 and FIG. 2

In summary, comparing the system configuration of FIG. 1 and the system configuration of FIG. 2, the configuration of FIG. 1 suppresses the occurrence of handover as much as possible, whereby the radio use efficiency is high. However, if the multiplicity is increased, the use efficiency has the upper limit, because the control information that can be transmitted is limited. On the other hand, in the configuration of FIG. 2, since the cover areas for transmitting the same control information can be restricted, the limitation on the control information as shown in FIG. 1 is less likely to occur, but the cell boundary occurs, whereby the lower use efficiency is caused by the handover.

In this way, the two system configurations have respective merits and demerits, and in constructing the radio network, it is required to make the design, including the conditions of "traffic of the control channel", "user traffic" and "interference". However, it is generally difficult to predict them, and the situation changes daily along with the progress of application for use at the terminal. It was difficult with the prior arts to construct the system that can cope with that situation. For example, in the case of transmitting the speech communication with the IP packet, a payload of the packet must be small in view of the influence of a delay. Therefore, it is required to flow a large number of small packets. Then, the traffic of control information regarding the scheduling is also increased. On the other hand, in the case of periodically flowing the packet of large payload, the scheduling information may be small. In this way, since the traffic of control information changes depending on the application, its forecast is difficult. Accordingly, it is required to construct the optimal configuration while dealing with changes in the traffic. One object of the invention and the embodiment is to provide means for automatically implementing the redesign.

Also, it is required to consider the position between the remote radio units in grouping. In the example as shown in FIG. 2, the remote radio units 101, 102 and 105 are the same group, but irrelevant to the connection sequence (101→102→103→104→105) with the apparatus. That is, it is considered that the connection sequence or ID of the apparatus has almost no relevancy with the grouping decided by the location of the apparatus. Therefore, a human operation of setting the assignment of the ID to the apparatus after arranging the remote radio unit (antenna) is required, spending more man-hour of installment construction. If there is a contrivance for automatically grasping the location and correlation of the remote radio unit (antenna) and properly making the grouping, the man-hour of construction can be reduced. It is another object of the invention and the embodiment to solve such a problem.

2. Base Band Unit (Radio Base Station Apparatus)

Figure 4:
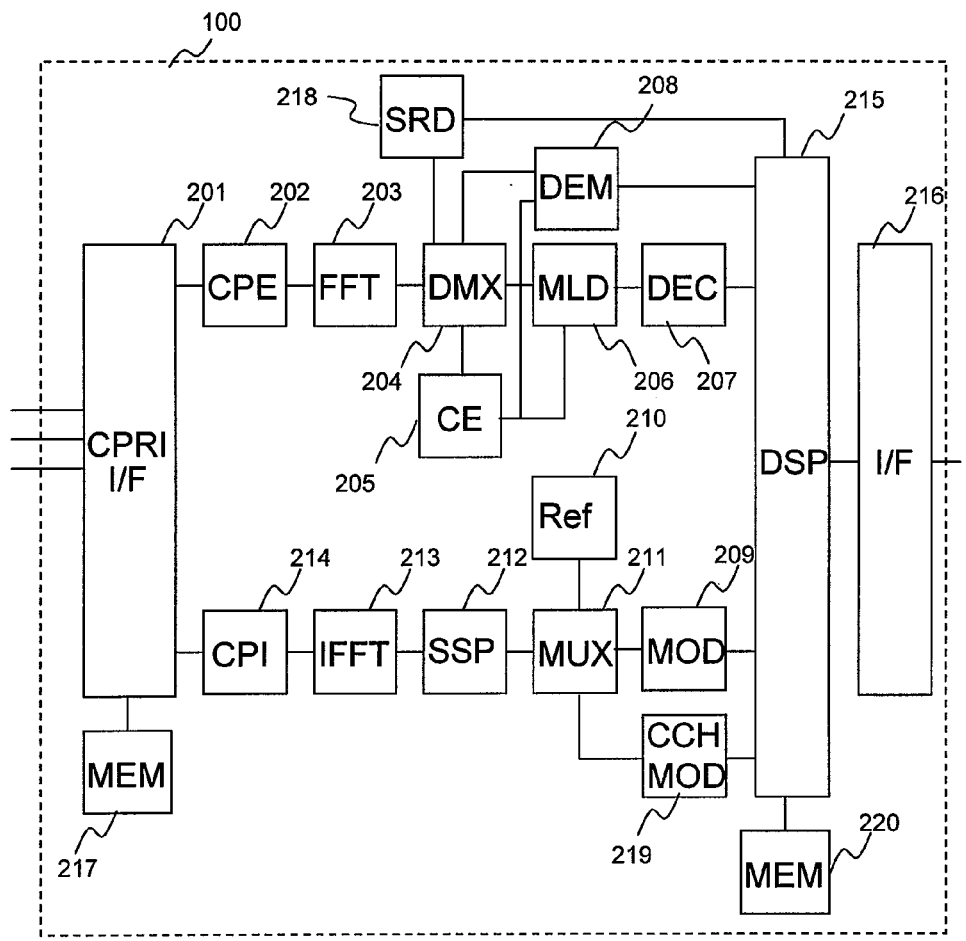
FIG. 4 is a configuration diagram of a base band unit 100 in the radio system according to this embodiment.
Figure 5:
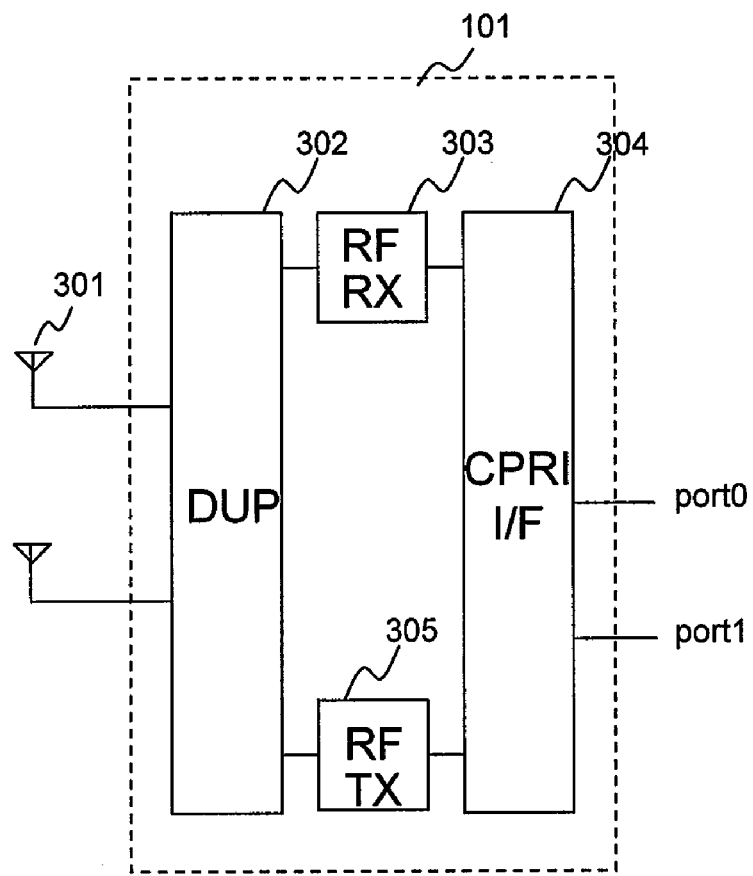
FIG. 5 is a configuration diagram of a remote radio unit 101 in the radio system according to this embodiment.

FIG. 4 shows a configuration diagram of the base band unit 100 according to the first embodiment. To simplify the explanation, an OFDMA is taken as an example, although it is apparent that the automatic adjustment that is a feature of the invention and the embodiment can effectively operate with a CDMA or the other radio methods, which is within the category of the invention. Though the operation with a Single-Input Single-Output (SISO) is mainly explained, it is apparent that the feature of the invention and the embodiment is unchanged with respect to a Multi-Input and Multi-Output (MIMO), which is within the category of the invention.

The base band unit 100 comprises a CPRI interface section 201, a DSP 215, a network interface 216, a memory 217 and a memory 220, which are common to a transmitting system and a receiving system. For the receiving system, it comprises a CP removal section 202, an FFT section 203, a demultiplexer section 204, a channel estimation section 205, an MLD section 206, a decoding section 207, a control channel demodulation section 208, and an analysis section 218. Also, for the transmitting system, it comprises an encoding section 209, a reference generation section 210, a multiplexer section 211, a spatial signal processing section 212, an IFFT section 213, a CP addition section 214, a control channel encoding section 219, and a control channel encoding section 219.

In FIG. 4, the base band unit 100 is connected to the remote radio unit 101 as shown in FIG. 5 (as detailed later), using the optical fiber, through the interface such as a CPRI (Common Public Radio Interface) or OBSAI (Open Base Station Architecture Initiative).

The receiving system for decoding the signal received by the remote radio unit will be firstly described below.

The data from each remote radio unit is converted into an effective base band signal in the CPRI interface section 201. On this occasion, the signals from plural remote radio units are converted successively into the base band signals. The converted data has the CP (Cyclic Prefix) removed at an appropriate timing in the CP removal section 202. The signal from which the CP is removed is converted into the signal in the frequency domain in the FFT section 203. The signal converted into the frequency domain is classified into the functional channels of "control channel", "user data channel (or shared channel)" and "reference signal" in the demultiplexer section 204.

Figure 7A:
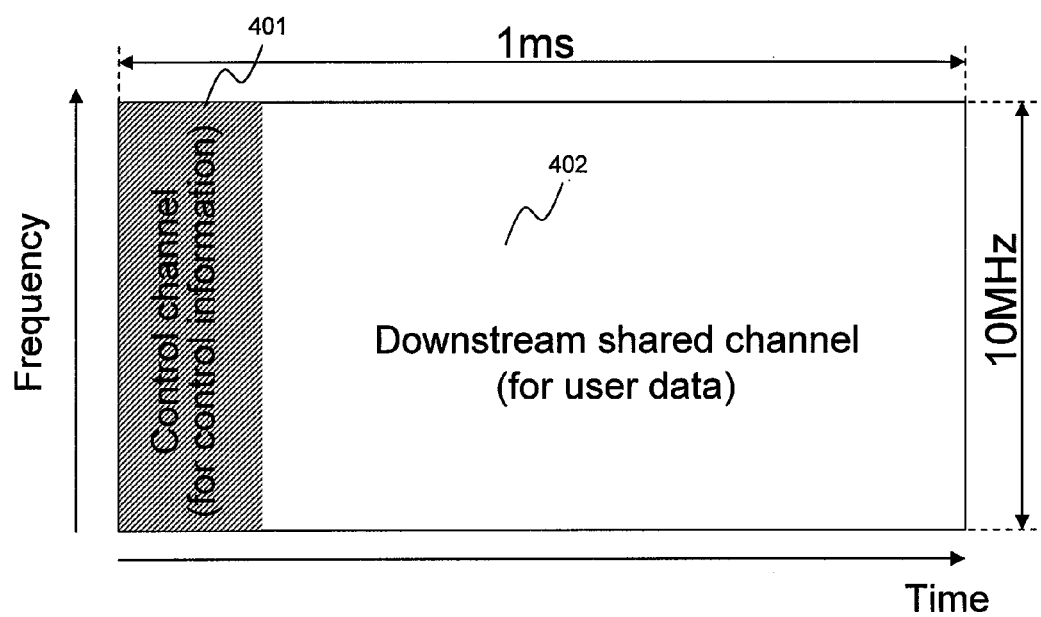
FIGS. 7A and 7B are views showing one bill (1) of the resource allocation according to this embodiment.
Figure 7B:
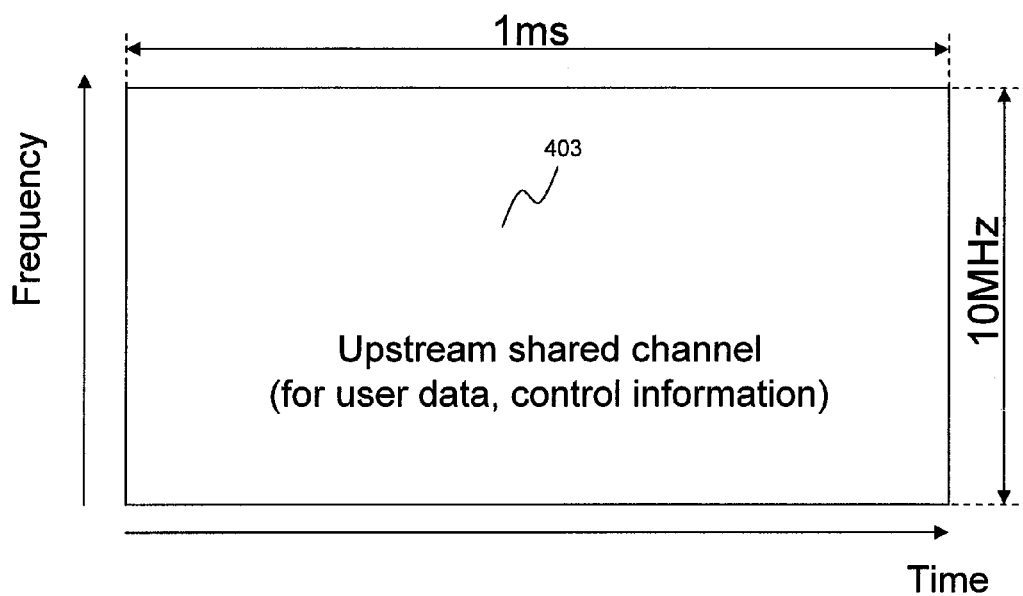

FIG. 7 is a view for explaining the radio resources. An upper view represents a downstream channel and a lower view represents an upstream channel. The longitudinal axis represents the frequency and the transverse axis represents the time. On the downstream channel, the control information is transmitted in a hatched part (401). The user data is transmitted in a white part (402) as the image.

The functional channels are arranged based on a prescribed rule in the two-dimensional resources of frequency axis×time axis, as shown in FIG. 7. The demultiplexer section decomposes the functional channels, based on the rule. The up link information 403 is all composed of the shared channel, in which the user data or control information is arranged in accordance with an instruction of a scheduler in the base station (base band unit). The demultiplexer section 204 takes out the information for each terminal from the information on the shared channel in accordance with the scheduler information. It further divides the taken-out information for each terminal into the "control information", "user data" and "reference signal". The channel estimation section 205 estimates the propagation path undergone by the received signal, using the reference signal as classified above. The control channel demodulation section 208 demodulates and decodes the control channel, using the estimation result of the propagation path estimated by the channel estimation section 205. The decoded result is passed to the DSP 215. The Maximum Likelihood Detection (MLD) section 206 obtains the result of a Minimum Mean Square Estimation (MMSE) for the received user data, using the propagation path estimation result and user data channel for each remote radio unit. With the MMSE, the information received by the plural remote radio units can be appropriately synthesized. Further, a logarithmic likelihood ratio (LLR) is computed from the synthesized information. The computed result is passed to the decoding section 207. The decoding section 207 performs a decoding process for the user data. The decoded user data is taken into the DSP 215, and transmitted via the network interface 216 over the network, after a cryptanalysis process at the upper level layer. The analysis section 218 of a Sounding Reference Signal (SRS) is linked to the output of the demultiplexer section 204 to analyze the reference signal or the SRS transmitted from the terminal. The analysis result is passed to the DSP 215, and employed as the judgment material for scheduling or grouping of the antennas. The operation of the analysis section 218 will be described later in detail.

Next, the transmitting system will be described below. The user data transmitted from the network is subjected to an encryption process the upper level layer in the DSP 215, and passed to the encoding section 209 to perform an error correcting encoding (or transmission path encoding) process such as a TURBO code, for example. Also, the control information transmitted from each remote radio unit is also generated in the DSP 215, and subjected to an encoding process in the control channel encoding section 219. Also, the reference generation section 210 generates a cell specific reference signal and a terminal specific reference signal. The generated reference signals, the encoded data of the user data and the encoded data of the control information are arranged in the resource of frequency×time×antenna in the multiplexer section 211.

FIG. 7 shows an example of the arrangement. For example, in the upper view, the control information is arranged in a resource 401 of the control channel and the user data is arranged in a resource 401 of the downstream shared channel in accordance with a scheduler contained within the DSP 215. The cell specific reference signal is dispersedly arranged in the symbol of a part of the control channel and/or shared channel. Also, the terminal specific reference signal is dispersedly arranged in the symbol of a part of the user data arranged in the shared channel.

In a down link frame structure as shown in FIG. 7, one frame structure is provided for each remote radio unit. That is, for example, if there are two remote radio units, two down link frame structures are required. The transmitting system generates the down link frame structures corresponding to the number of remote radio units in this way.

Figure 8:
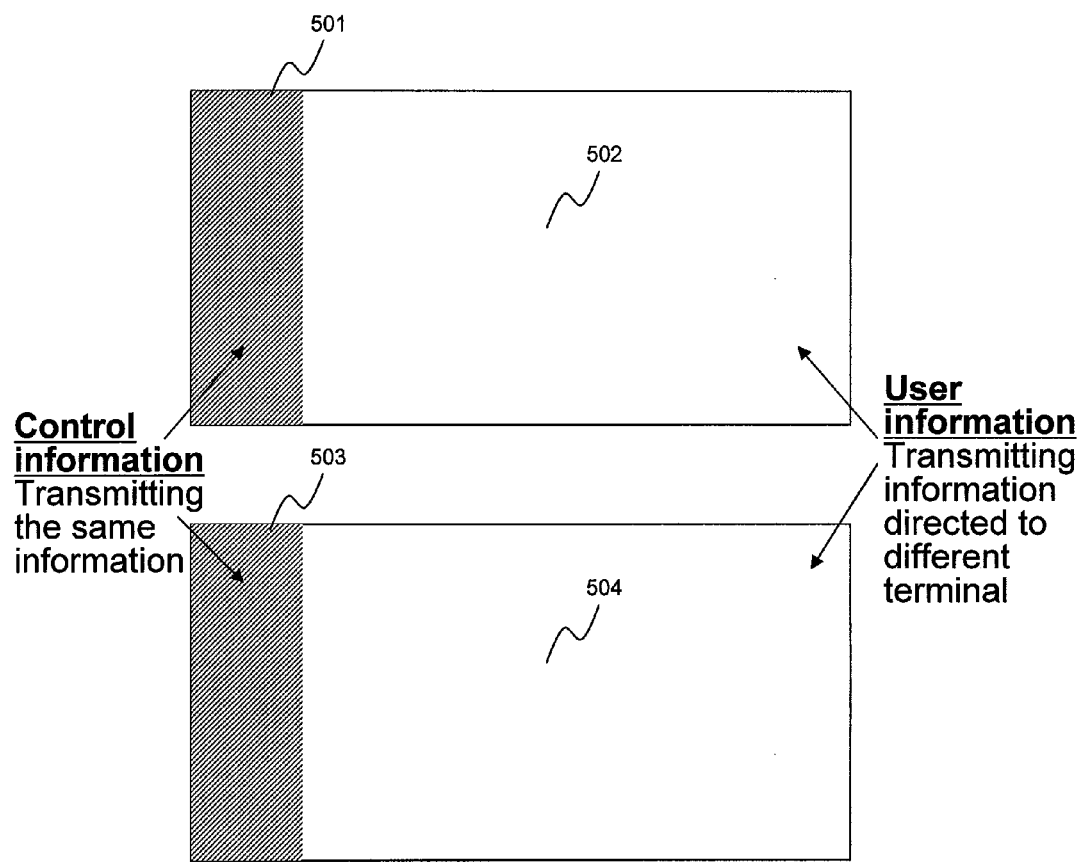
FIG. 8 is a view showing one bill (2) of the resource allocation according to this embodiment.

FIG. 8 is a view showing one bill (2) for resource allocation according to this embodiment. FIG. 8 shows the down link frame structure in the case of FIG. 1 as previously described, in which the same control information is arranged in the hatched parts (501, 503), irrespective of the different remote radio units, and the user data directed to different terminals are arranged in the white parts (502, 504).

Figure 9:
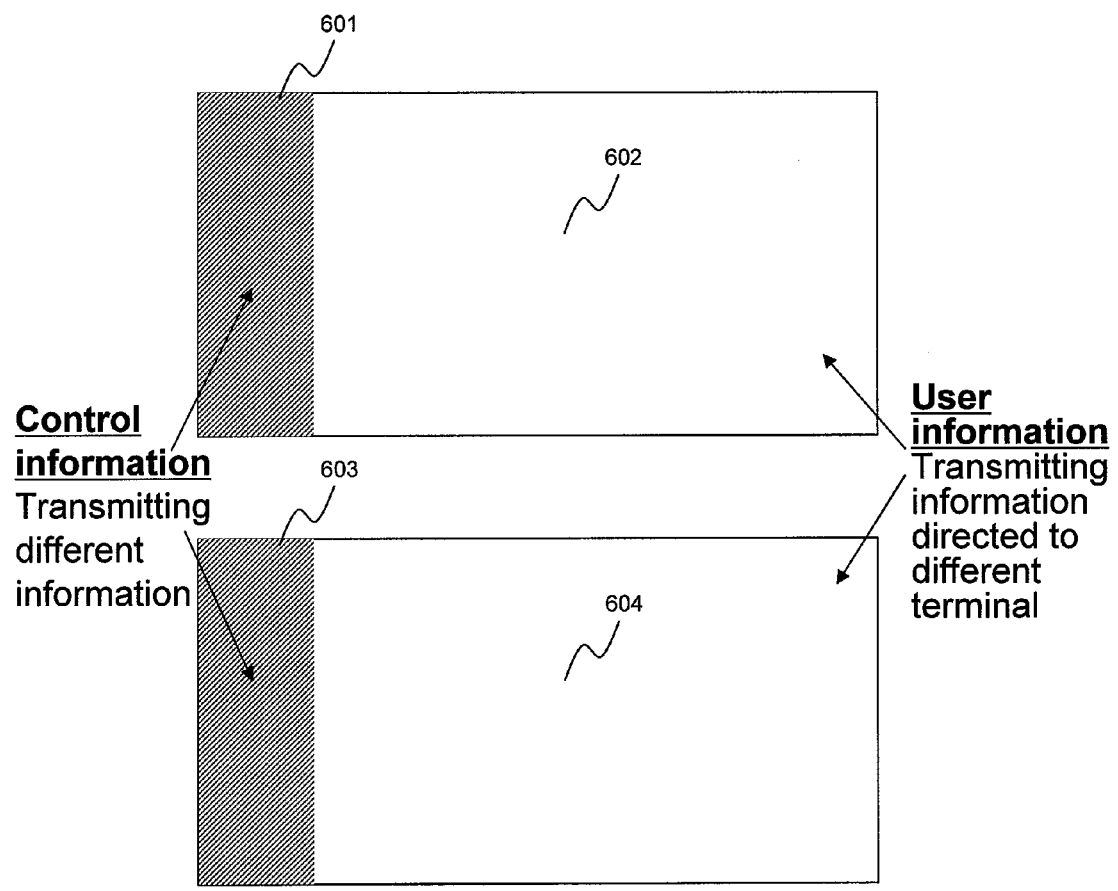
FIG. 9 is a view showing one bill (3) of the resource allocation according to this embodiment.

Also, FIG. 9 is a view showing one bill (3) for resource allocation according to this embodiment. Similarly, FIG. 9 shows the down link frame structures for the remote radio units in different groups in the case of FIG. 2, in which the different control information are arranged in the hatched parts (601, 603), because of the remote radio units in different groups. In this embodiment, the grouped remote radio units are decided with the parameters automatically set in the DSP 215, in which the same control information is set in the grouped remote radio units.

The spatial signal processing section 212 performs a precoding process for applying a spatial weight to the transmit information arranged by the multiplexer section 211. In the precoding, the weight of precoding is decided, using the result estimated by the terminal. The spatial signal processing section 212 also performs the signal processing for selecting the remote radio unit, in addition to the precoding process. That is, the transmit signal is multiplied by a weight vector in accordance with a selection of the transmitting remote radio unit decided by the scheduler, whereby the selection of the remote radio unit to transmit the signal from the specific antenna alone is implemented. Also, the spatial multiplexing of transmitting the user information to the plural terminals that are separated spatially, using the same resource at the same time, is also implemented by weighting in the spatial signal processing section 212. Accordingly, the first transmitting method, the second transmitting method and the third transmitting method, which are the methods for transmitting the user data as previously described, are performed by the spatial signal processing section 212. The spatial signal processing section 212 can freely set the weight for each channel with the functional channel arrangement of resources divided by frequency×time. For example, the control channel that notifies the control information is transmitted from all the remote radio units within the cell, and the individual user data channel has different weight for each remote radio unit, as already described. For the user data channel, the resource allocation is different for each terminal, and correspondingly the individual weight can be applied.

The IFFT section 213, following the spatial signal processing section 212, transforms the transmit information after the spatial signal processing from the frequency domain to the time domain. Further, the CP addition section 214 adds the CP as a multi-path measure. The signal having the CP added is transmitted via the CPRI interface section 201 to the remote radio units 101 to 105 as the radio signal.

3. Remote Radio Unit

FIG. 5 is a functional block diagram of the remote radio unit 101. The other remote radio units 102 to 105 have also the same configuration. The remote radio unit 101 comprises an antenna 301, a duplexer 302, a receiving unit 303, a CPRI interface section 304 and a sending unit 305. The CPRI interface section 304 has two ports on the base band side and is connected to the receiving unit 303 and the sending unit 305 for the radio section in this example.

First of all, the transmitting system will be described below. The sending unit 305 converts the information received from the base band unit 100 via the interface section 304 into the radio frequency, and transmits the converted information from the antenna 301 via the duplexer 302. Next, the receiving system will be described below. A signal received via the antenna 301 is inputted conversely via the duplexer 302 into the receiving unit 303, and converted into a base band signal through the frequency transformation. Further, it is converted into a digital signal and transmitted via the interface section 304 through the transmission path such as the optical fiber to the base band unit 100.

Figure 3:
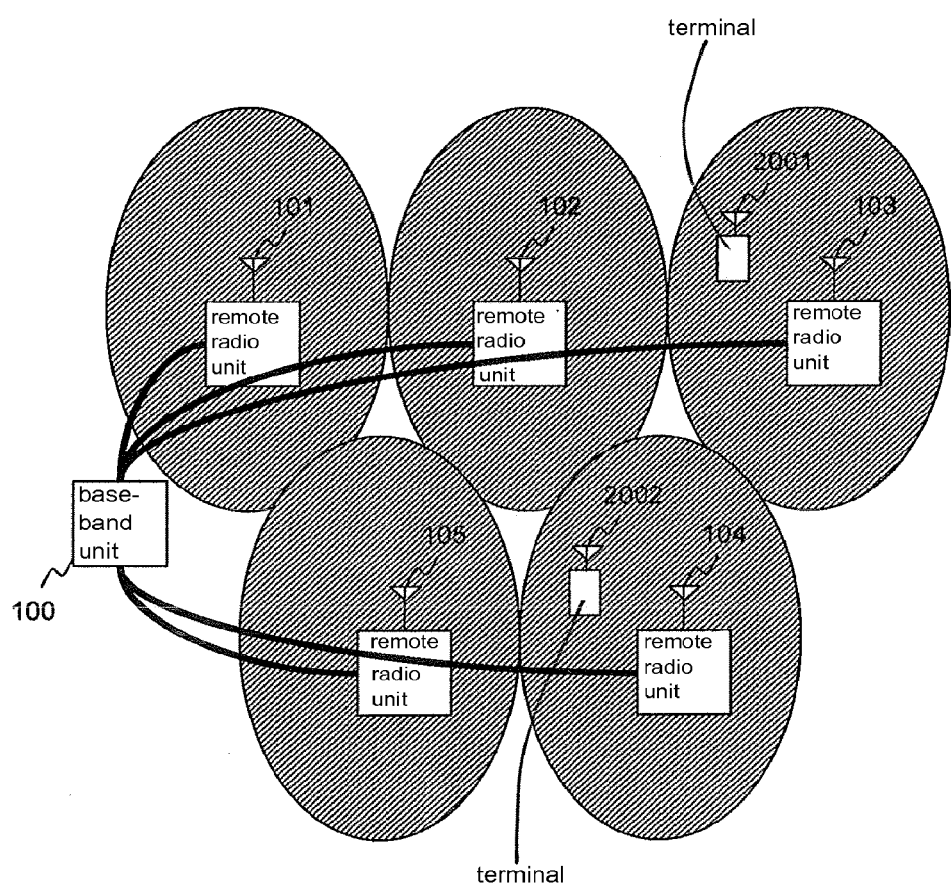
FIG. 3 is a view showing one example of the cell organization in the radio system according to this embodiment.
Figure 6:
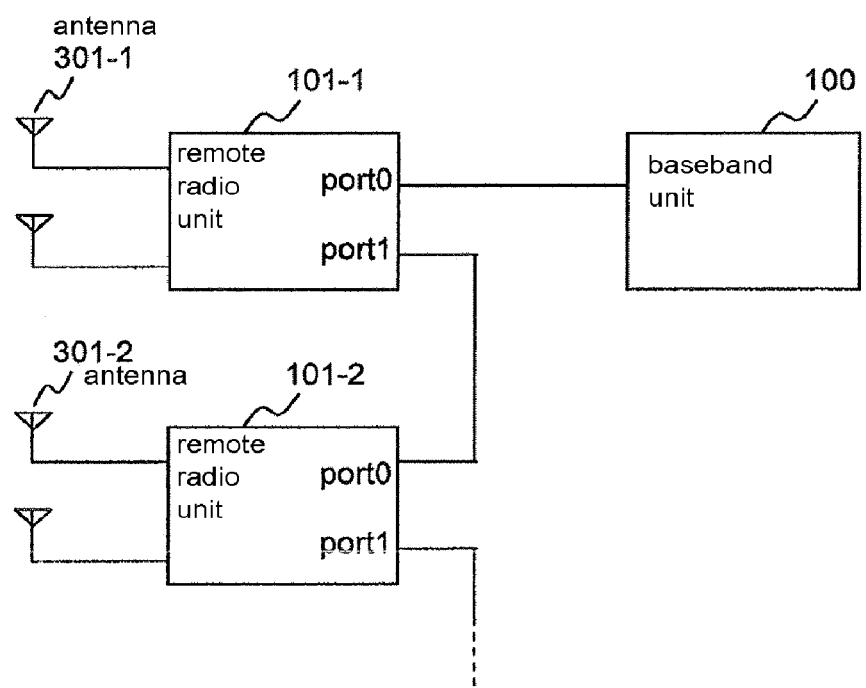
FIG. 6 is a connection diagram of the remote radio unit in the radio system according to this embodiment.

Herein, a connection diagram of the remote radio units in the radio system according to this embodiment is shown in FIG. 6. There are two ports 0 and 1 on the base band side in FIG. 5, because it is supposed that the plural remote radio units can be connected by daisy chain as shown in FIG. 6. However, this embodiment can be realized by the configuration in which one base band unit is linked to the plural remote radio units, as shown in FIG. 3, and in this case, the daisy chain configuration is unnecessary. That is, it is not an essential condition for the invention and this embodiment that there are two ports on the base band side.

4. Computation of Correlation Matrix by Analysis Section

FIG. 10 shows a functional diagram of the analysis section 218. In FIG. 4, for the convenience sake of the drawing, only one receiving system such as the FFT section 203 and the demultiplexer section 204 is shown, but the base band unit 100 is linked to the plural remote radio units 101 to 105, whereby the processing for the plural remote radio units is required. Accordingly, the functions of the receiving system such as the FFT section 203 and the demultiplexer section 204 are required corresponding to the number of remote radio units. In the actual process, one FFT section 203 can be operated in time division multiplexing to equivalently perform the processing corresponding to the plural remote radio units, whereby the hardware corresponding to the number of remote radio units is not necessarily required, although for the convenience sake of explanation, the FFT sections (203-1 to 203-$n$) corresponding to the number of remote radio units are shown in FIG. 10. The output of the FFT section 203 is the received signal in the frequency domain, and the reference signal or SRS is arranged in its specific resource. The demultiplexer section 204 takes out the information dispersedly arranged, and sends the taken-out information to the analysis section 218.

The operation of the analysis section 218 will be described below. The information received by the base band unit 100 is represented by $$x_{i,k}(f) = h_{i,k}(f) c_k(f) + n_{i,k}(f) \quad \text{Expression 1}$$

Where x(f) is the received signal in the frequency domain, h(f) is the propagation channel in the frequency domain, c(f) is the known information such as the reference signal or SRS, and n(f) is the added noise in the frequency domain. A suffix k denotes a user identifier and i denotes an identifier of the remote radio unit (antenna). The decoding sections 701-1 to 701-$n$ take out the propagation path estimated information $h_{i,k}(f)$ ($c_k^*(f) \cdot x_{i,k}(f)$) by multiplying the received signal x(f) by the complex conjugate of c(f) (it is supposed that the added noise component is sufficiently lower than the received signal). The IFFT sections 702-1 to 702-$n$ perform an IFFT process for the obtained propagation channel estimated information to be restored from the frequency domain to the time domain. The output of the IFFT section 702 is a delay profile ($X_{i,k}(\tau)$) of the propagation channel. The power computation sections 703-1 to 703-$n$ select the path beyond a threshold $Th_{i,k}$ from the obtained delay profile, and obtain the sum of the power.

$$S_i(k) = \sum_{|X_{i,k}(\tau_{i,k})| > Th_{i,k}} |X_{i,k}(\tau_{i,k})|^2 \quad \text{Expression 2}$$

$X_{i,k}(\tau)$ is the inverse Fourier transformation of $c_k^*(f) \cdot x_{i,k}(f)$. $\tau_{i,k}$ denotes selecting $|X_{i,k}(\tau_{i,k})|$ exceeding the threshold $Th_{i,k}$.

The threshold $Th_{i,k}$ is computed in the threshold computation sections 704-1 to 704-$n$ from $$Th_{i,k} = \alpha \sum_f |x_{i,k}(f)|^2 \quad \text{Expression 3}$$

Where $\alpha$ is a parameter for deciding the existence of the path, and a fixed value that is decided beforehand. The threshold is computed by multiplying the total received power by a fixed coefficient. Normalizing the expression 2, $$\overline{S_j(k_i)} = \frac{S_j(k_i)}{S_i(k_i)} \quad \text{Expression 4}$$

$k_i$ designates the user who selects the remote radio unit i as the connection destination is obtained. The expression 4 has the received power $S_j(k_i)$ when the signal transmitted by the user $k_i$ connecting to the remote radio unit i is received by the other remote radio unit j as a numerator, and makes the normalization by dividing it by the received power $S_i(k_i)$ when the signal transmitted by the user $k_i$ is received by the remote radio unit i. With the normalization, the index of the terminal having great interference on the other remote radio units is closer to one, and the index of the terminal having no interference is a value near zero. The above operation up to the normalization is performed in the power computation sections 703-1 to 703-$n$.

A judgment of which remote radio unit is connected within the group of the remoter radio units transmitting the same control information is made in the analysis section 218. The analysis section 218 measures the received power $S_i(k)$ of the reference signal transmitted by each user k in each remote radio unit i. The DSP 215 is reported which remote radio unit has the maximum received power for each terminal and determines the remote radio unit to be selected from that information. Also, the result of this received power can be employed for the operation of the integrated scheduler as described in connection with FIG. 1. To realize the integrated scheduler, it is required that the reference signal transmitted by the concerned terminal is received by the plural remote radio units to grasp the received power. However, the received power required for this operation is already contained in the above description, and the base band unit can know that value. The scheduler mounted on the DSP 215 makes the integrated scheduling, employing such information, and can perform the first transmitting method, the second transmitting method and the third transmitting method.

The index indicating the statistic regarding all of the users with the expression 4 dispersed over various places is obtained as $$\Delta_{ij} = \Delta_{ji} = \sum_{k_i} \overline{S_j(k_i)} + \sum_{k_j} \overline{S_i(k_j)} \qquad \text{Expression 5}$$

In the expression 4, the index indicates the interference power that the terminal connecting to one remote radio unit has on the other remote radio unit, with one user (radio terminal) as a target. The first term in the right side of the expression 5 is the interference power investigated for all of the terminals connecting to the one remote radio unit. Also, the second term in the right side is the interference power on the one remote radio unit investigated for the terminals connecting to the other remote radio unit. The expression 5 means that the index represents the degree of interference between two remote radio units with their sum. For example, if five terminals are concentrated at the boundary between two adjacent remote radio units, the value of the expression 5 is near 5. Conversely, the five terminals move closer to respective remote radio terminals, the value of the expression 5 is near zero. Also, if the remote radio unit of object is located away and another remote radio unit is intervened, there is less influence of interference on the other remote radio unit even if the terminals are concentrated at the boundary, whereby the value of the expression 5 is near zero.

A statistical processing section 700 receives the index indicating the normalized interference power as represented in the expression 4 from the power computation sections 703-1 to 703-*n* and computes the index indicating the statistic regarding all of the users as represented in the expression 5 based on the index of the normalized interference power. And the statistical processing section 700 computes a correlation matrix in which the element of the matrix for each remote radio unit is each obtained index.

$$R = \begin{bmatrix} \Delta_{11} & \Delta_{12} & \Delta_{13} \\ \Delta_{21} & \Delta_{22} & \Delta_{23} \\ \Delta_{31} & \Delta_{32} & \Delta_{33} \end{bmatrix} \qquad \text{Expression 6}$$

Herein, the case of three remote radio units is taken as an example. The statistical processing section 700 sends the computed correlation matrix R to the DSP 215.

Figure 14:
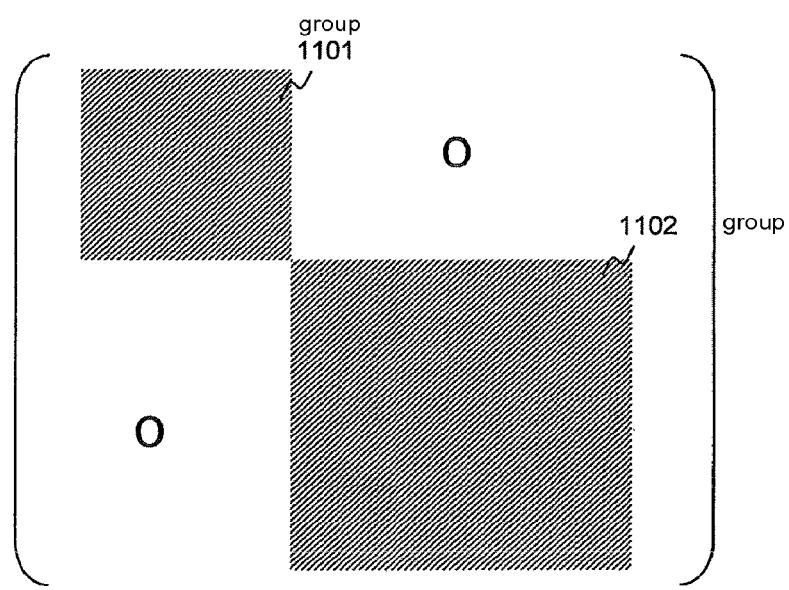
FIG. 14 is an explanatory view for the transformation result of the correlation matrix targeted to perform the grouping.

Herein, FIG. 14 is an explanatory view showing the result of transforming the correlation matrix to be targeted to perform the grouping. The DSP 215 transforms the obtained correlation matrix to the partially orthogonalized matrix as shown in FIG. 14, dividing into two groups, group 1101 and group 1102. The transformation for partial orthogonalization can be made by repeating the operation of exchanging j row and k row and j column and k column, which are appropriately selected, at the same time. This method will be described later, using the specific numerical value example.

The longitudinal axis or transverse axis of the matrix in FIG. 14 corresponds to the number designating each remote radio unit. The element ij is the index indicating the correlation between the remote radio unit i and the remote radio unit j. If the element of the index is near zero, it is indicated that there is almost no terminal under the command of two remote radio units which has influence on the other remote radio unit. Conversely, the hatched part where the numerical value of the element is large indicates that there is at least the terminal under the command of two remote radio units, which has influence on the other remote radio unit. Hence, the two groups 1101 and 1102 indicate that the interference between the groups is unlikely to occur as the statistical value of the users dispersed over various places. Accordingly, it is meant that two groups with less interference can be found by transforming the correlation matrix obtained in the form of the expression 6 into the form of FIG. 14, whereby it is apparent that a controversial method for dividing into groups with less interference can be established.

5. Grouping with the DSP 215

Referring to FIGS. 11A to 11C and FIG. 12, a procedure for grouping to be performed by the DSP 215 will be specifically described below.

There are two important points in performing the grouping. One of the points involves optimizing the dividing employing the correlation matrix as mentioned before, and the other point involves confirming the traffic on the control channel.

For the traffic on the control channel, it is required to check to see if the limited capacity of the control channel is exceeded in dividing the present group. There is no problem that the cover areas to transmit the control channel extend over the plural remote radio units, as previously described with a difference between FIGS. 1 and 2, but the capacity of the control channel is limited. If the capacity limitation is exceeded, it is required to divide the cover area of transmitting the same control channel. In dividing the cover area, there is an overhead due to handover, whereby the radio use efficiency is lower. Accordingly, it is required to consider the configuration where the number of divisions is minimum. After all, in judging the division, it is required to check the traffic on the control channel.

Referring to FIG. 11, a specific example of the correlation matrix will be firstly described below.

Figure 11A:
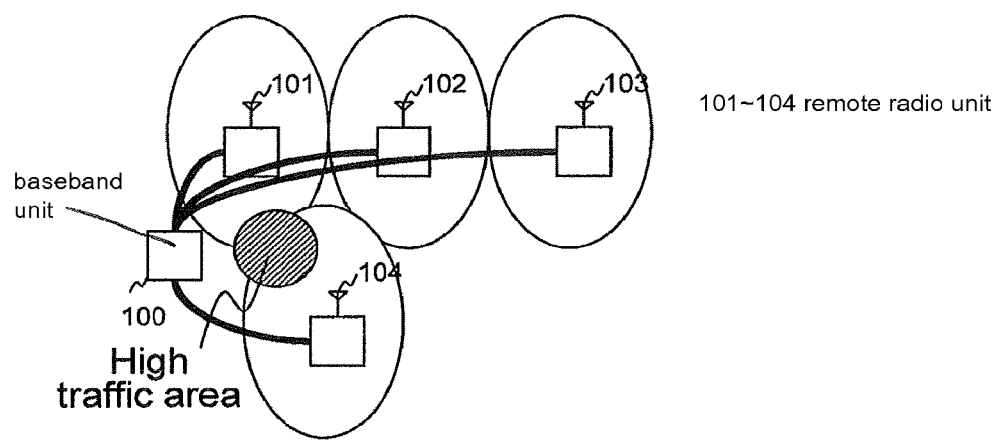
FIG. 11A is a view showing a configuration example of the remote radio unit.
Figure 11B:
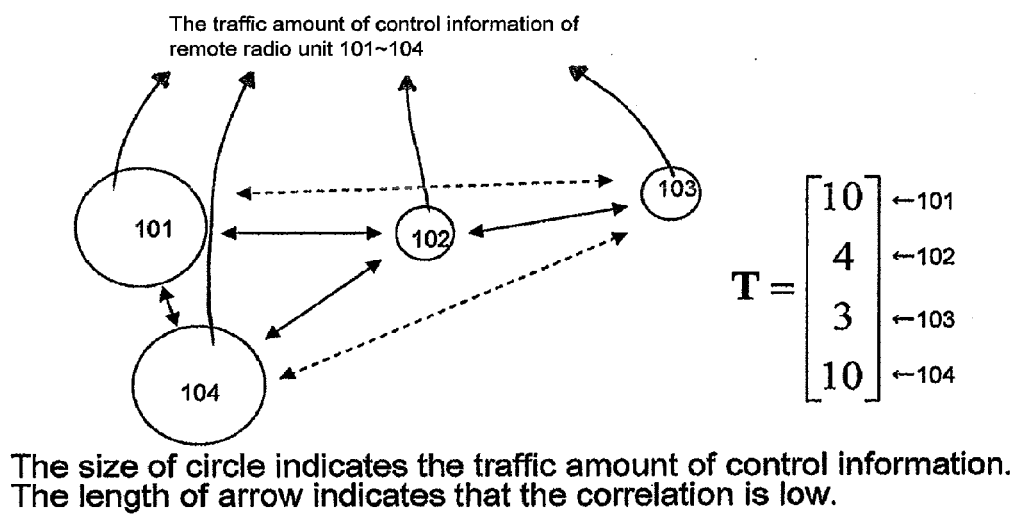
FIG. 11B is a view showing the relationship in distance between the antennas.

FIG. 11A is a view showing a configuration example of the remote radio unit. In FIG. 11A, a high traffic area is defined as an example. For four remote radio units, the remote radio units 101 and 104 have high traffic, and the remote radio units 102 and 103 have low traffic. For the location of each antenna, the distance between the remote radio units 101 and 102, the distance between the remote radio units 101 and 104, and the distance between the remote radio units 102 and 103 are shorter, while the distance between the remote radio units 101 and 103 and the distance between the remote radio units 103 and 104 are larger. Arranging this relationship, a view of representing the distance relation between the antennas as shown in FIG. 11B is obtained. Herein, the size of a circle is related to the magnitude of traffic and the distance from circle to circle is related to the actual distance between the antennas. The traffic T on the control channel is represented by a vector, for example, with the values as shown in FIG. 11B. Since the traffic on the control channel has essentially the value relevant to the traffic of the remote radio unit, the vector coincides with the diagonal elements of R in this example, to be easily understandable herein. FIG. 11C is an explanatory view showing the correlation matrix (before transformation, after transformation). Calculating the correlation matrix, the correlation matrix R on the left side of FIG. 11C is obtained. This is transformed into the partially orthogonalized matrix R' on the right side in which the hatched part is larger.

Figure 12:
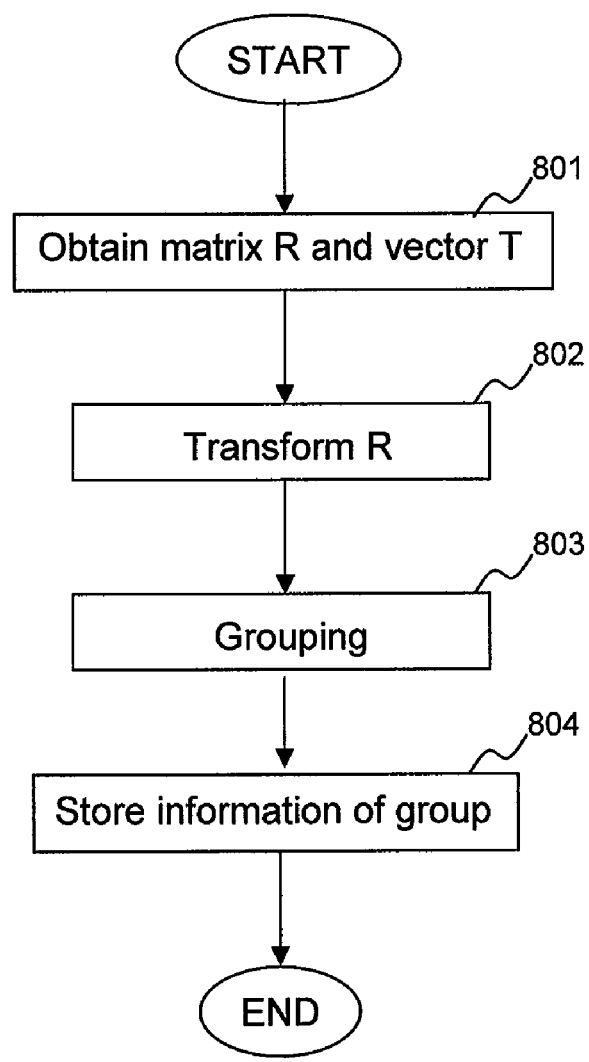
FIG. 12 is a flowchart for grouping according to this embodiment.

FIG. 12 is a flowchart for grouping according to this embodiment. In FIG. 12, first of all, the DSP 215 acquires the correlation matrix R (expression 6) from the analysis section 218 with a certain periodical trigger (e.g., in units of time, day, or day of week) at step 801. Also, the DSP 215 analyzes which remote radio unit in the same group the terminal should be connected to. The DSP 215 checks the traffic on the control channel to be transmitted to each terminal, and obtains the total Ti of traffic on the control channel for each remote radio unit as represented by $$T_i = \sum_{k_i} t(k_i) \qquad \text{Expression 7}$$

$k_i$ denotes the user connecting to the remote radio unit i.

Where t(k) denotes the traffic of control information for the user k. Since the remote radio unit for connection is different for each user, the traffic of control information is totalized for each remote radio unit for connection. Since the correlation matrix or the traffic on the control channel drastically changes depending on the situation, the time leveling with the forgetting mean may be made as in $$R_{renew} = (1-\lambda)R_{old} + \lambda R_{measured} \qquad \text{Expression 8}$$

or $$T_{renew} = (1-\lambda)T_{old} + \lambda T_{measured} \qquad \text{Expression 9}$$

As the trigger for updating R or T, the frame timing or its integral multiple may be adequate.

Next, the DSP 215 transforms the correlation matrix into the partially orthogonalized matrix (step 802). Though the details of the transformation method will be described later, if R is obtained through this transformation as shown on the left side of FIG. 11C, this R is transformed into the partially orthogonalized correlation matrix R' for determining the grouping as shown on the right side of FIG. 11C.

Next, the DSP 215 divides the remote radio units into the groups including one or more remote radio units in accordance with the sequence of rows or columns of the partial orthogonal matrix R' so that the total traffic for each group adding the total of traffic for one or more remote radio units within the group may be less than or equal to a predetermined threshold (803). And the DSP 215 performs the grouping by storing the identification number of the remote radio unit for each group in a memory 220 (804).

Herein, the DSP 215 obtains the total traffic for each group from the current divisions in terms of the traffic of control information. This operation involves calculating the total traffic for each group by totalizing the traffic of control information for each remote radio unit as obtained in the expression 7 for each group of the remote radio unit adopted at present.

At steps 803 and 804, the DSP 215 can specifically perform the grouping as in the following examples 1 to 3.

EXAMPLE 1

The DSP 215 divides the remote radio units into a plurality of group candidates, based on the diagonal elements of the partial orthogonal matrix R', and obtains the total traffic for each group candidate by adding the total of traffic on the control channel for one or more remote radio units included in each divided group candidate. The DSP 215 compares the obtained total traffic for each group candidate with a predetermined threshold, in which if the total traffic is greater than or equal to the threshold, the grouping is performed by further dividing the group candidate so that the total traffic may be smaller than the threshold.

EXAMPLE 2

The DSP 215 divides the remote radio units into a plurality of groups, based on the diagonal elements of the partial orthogonal matrix R', and obtains the total traffic for each group by adding the total of traffic on the control channel for one or more remote radio units included in each divided group. Then, the DSP 215 compares the obtained total traffic for each group with a predetermined threshold. And the DSP 215 selects a certain group, and if the total traffic of that group is greater than or equal to the threshold, the grouping is performed by further dividing that group so that the total traffic may be smaller than the threshold. On the other hand, the DSP 215 selects a certain group, and if the total traffic of the group is smaller than the threshold, a new group is formed by adding further one or more groups, or one or more remote radio units to the selected group, and the grouping is performed so that the total traffic of the new group may be smaller than the threshold.

EXAMPLE 3

The DSP 215 selects the remote radio units one by one in accordance with the sequence of rows or columns of the partial orthogonal matrix R', successively adds them to the group, and obtains the total traffic for each group by adding the total Ti of traffic for one or more remote radio units within the group. The DSP 215 makes the grouping by adding the remote radio units to the group within the range where the total traffic does not exceed a predetermined threshold.

Referring to FIG. 11, the example 3 will be described below in more detail.

At step 805, the DSP 215 selects one remote radio unit corresponding to the upper left term of the correlation matrix (right view of FIG. 11C) after transformation of partial orthogonalization calculated at step 802, and obtains the traffic amount on the control channel for that remote radio unit from the expression 7. In the example of FIG. 11C, the remote radio unit 101 is selected. From FIG. 11B, it can be found that the traffic of control information for the selected remote radio unit is 10. The obtained traffic amount on the control channel is compared with a predetermined threshold λ. If the traffic amount is below the threshold, the next remote radio unit 104 consecutive in the correlation matrix after transformation of partial orthogonalization (right view of FIG. 11C) is selected. For example, the threshold λ is the upper limit value of the traffic of control information decided by the method with a margin. The sum total (10+10=20 in FIG. 11B) of traffic for two remote radio units in total is obtained and compared with the threshold λ, in which if the sum total of traffic is below the threshold, the third remote radio unit 103 is further selected. Similarly, the sum total (10+10+3=23) of traffic on the control channel for three remote radio units in total is obtained and compared with the threshold λ. By repeating this series of process, if the total traffic exceeds the threshold, the grouping is performed for the selected antennas immediately before the threshold is exceeded. For example, in FIG. 11C, the remote radio units 101, 104 and 103 are selected, and if the total traffic firstly exceeds the threshold when the remote radio unit 103 is selected, the remote radio units 101 and 104 are made the same group 1. Subsequently, the same operation is performed from the remote radio unit 103, but since the remote radio units 103 and 102 have small traffic, the threshold is not exceeded after all, whereby the remote radio units 103 and 102 are selected as the same group 2.

6. Partial Matrix

Figure 18:
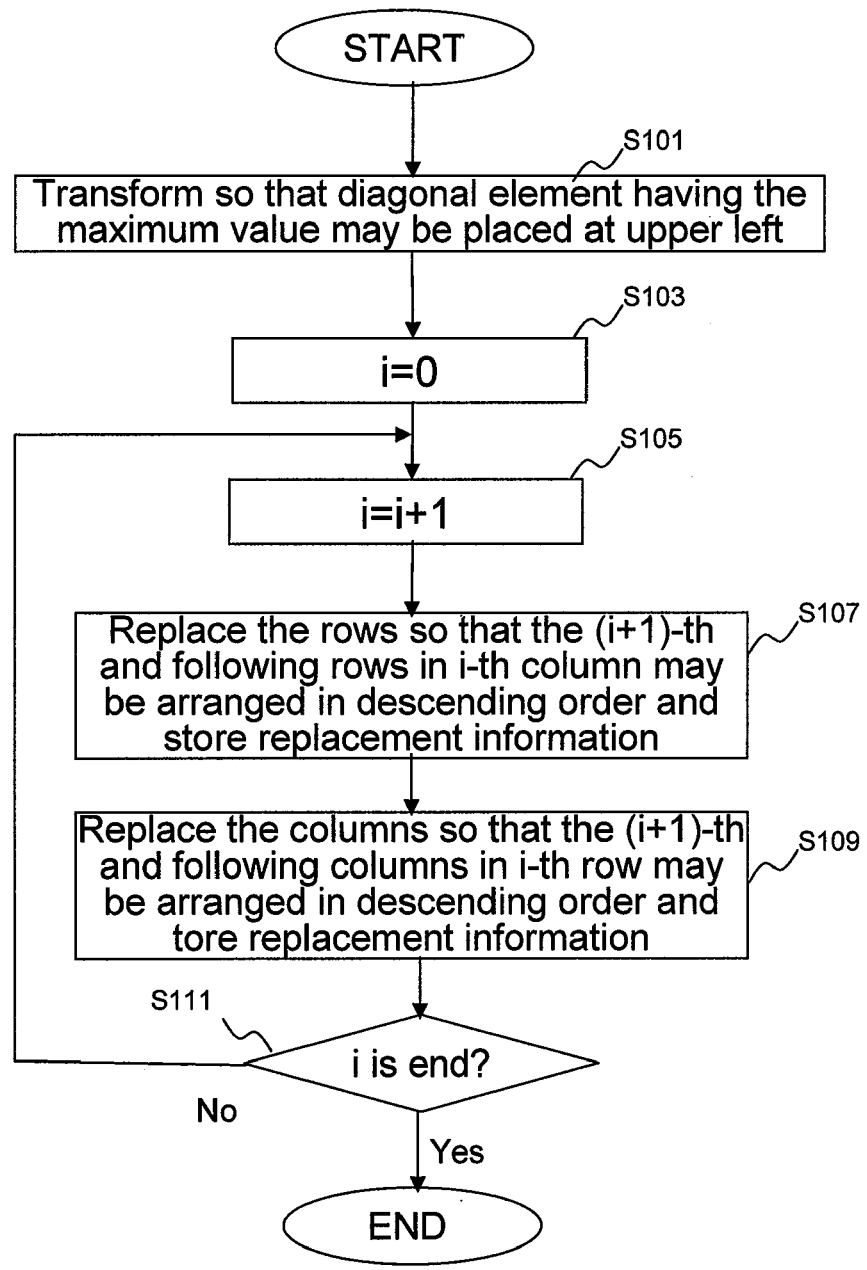
FIG. 18 is a flowchart for the partial orthogonalization of the correlation matrix.

FIG. 17 is an explanatory view of partial orthogonalization for the correlation matrix, and FIG. 18 is a flowchart of partial orthogonalization for the correlation matrix.

Referring to FIGS. 17 and 18, a transformation method into the partial matrix with the DSP 215 as indicated at step 802 will be described below by way of example.

First of all, the DSP 215 transforms the correlation matrix R so that the diagonal element having the maximum value may be placed at the upper left. The appropriate two rows are selected and subjected to a replacement operation. Then, the corresponding columns are selected and subjected to the replacement operation. Considering this replacement operation of rows and columns as a set, the correlation matrix is transformed so that the diagonal element having the maximum value and the upper left element are replaced (S101). In FIG. 11C, the maximum diagonal element is 10, which is already placed at the upper left, whereby this transformation is unnecessary.

The DSP 215 sets i (S103, S105). First of all, i=1, and the DSP 215, in view of the first column, transforms (exchanges) the rows so that the second and following rows may be arranged in the descending order (S107). In the example of R in FIG. 11C, the values of the first column in the second to fourth rows are [1, 1, 8], in which 8 is the largest, whereby the second row and the fourth row are replaced (FIG. 17, step 1). Further, the DSP 215, in view of the first row, transforms (exchanges) the columns so that the second and following columns may be arranged in the descending order (S109). In this example, similarly, the second column and the fourth column are replaced (FIG. 17, step 2). In the same way, the DSP 215 performs the transformation for the first column and the first row so that all of the rows and columns may be arranged in the descending order. In the example of FIG. 17, [8, 1, 1] is put in the descending order through one transformation, whereby there is no further transformation.

Next, the DSP 215 increments i (S111, S105), and in view of the second column, transforms the rows so that the third and following rows may be arranged in the descending order. In the example of FIG. 17, the values of the second column in the third and fourth rows are already arranged in the descending order as [2, 1], whereby there is no transformation.

In this way, if the transformation up to the final column is completed by incrementing the column number for evaluation successively, the transformation is ended.

As a notice point of transformation, the correspondence between the remote radio units 101 to 104 corresponding to the rows (or columns) is changed by replacing the rows (or columns), as shown on the right side of FIG. 11C, whereby it is required to store the replacement information so that the remote radio units can be associated with the rows (or columns, or both the rows and columns). With these operations, the transformation result on the right side of FIG. 11C (R' at the lower stage of FIG. 11D) is obtained.

7. Supplements

In the radio resources as shown in FIG. 7, the point herein is that the amount of control information that can be flowed is predetermined in the system. For example, in a system having a plurality of remote radio units in which the capacity of the user data can be increased by spatial multiplexing, the information amount of the control channel can not be transmitted beyond the capacity transmittable via one antenna predetermined in the radio method. For example, in a Long Term Evolution (LTE) as discussed in the 3GPP, a maximum of 3OFDM symbols at the top of each sub-frame is defined as the resource capable of transmitting the control channel. Also, there are various kinds of reference signals (defined as the Reference Signal on the standardization) for estimating the propagation path, but in detecting the control signal to be transmitted commonly, only the Cell specific reference signal can be employed. It is required that the Cell specific reference signal is transmitted with a specified antenna weight (or precoding) from the remote radio unit defined as the same cell. This means that the spatial multiplexing can not be made within the same cell in the control channel transmission. Accordingly, in an area where this control information can be transmitted, the traffic can not be increased by spatial multiplexing.

The above threshold λ is the upper limit value of traffic of control information decided by the method with a margin. The measured value is compared with the threshold λ, in which if the measured value is beyond the threshold, the resource for transmitting the control information is insufficient, whereby it is required that the cell (cover area for transmitting the same control information) is divided.

Figure 19:
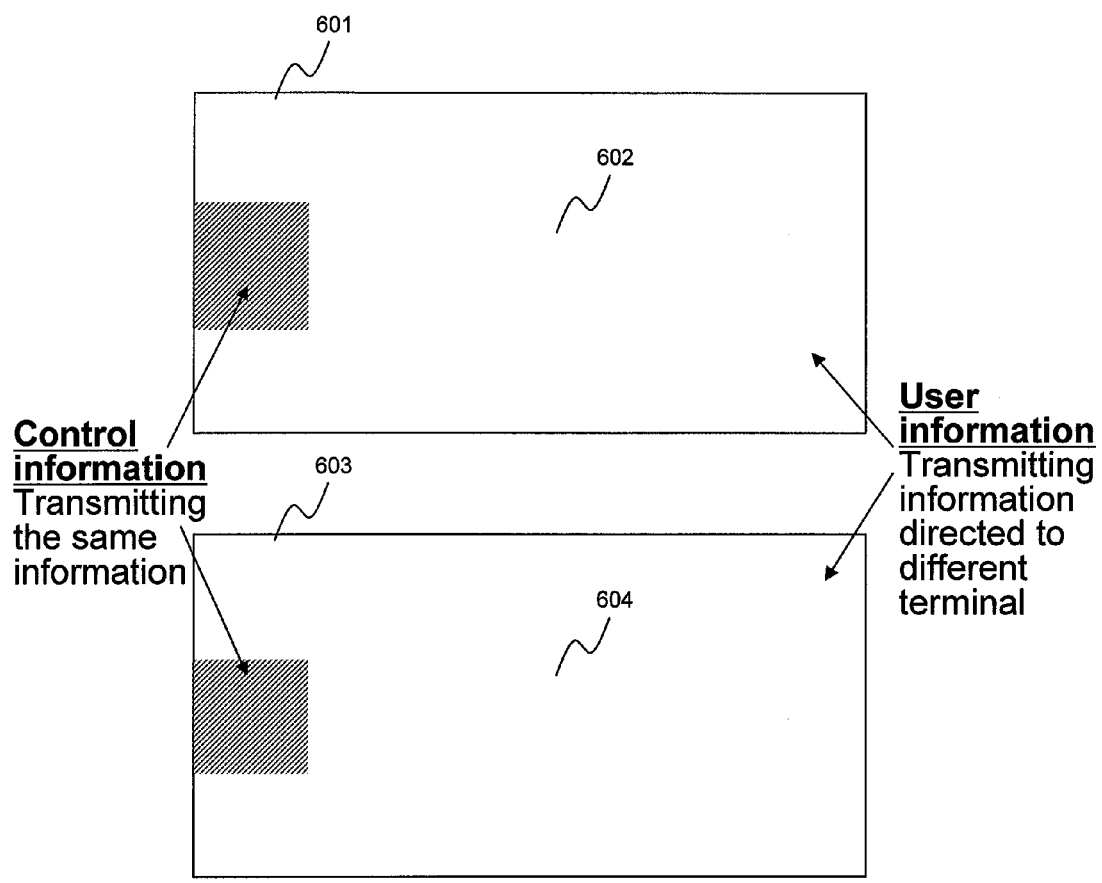
FIG. 19 is a view showing one bill (4) of the resource allocation.

Also, FIG. 19 is a view showing one bill (4) for resource allocation.

Though the control information is widely distributed along the frequency axis in FIG. 8, the effects of the invention and this embodiment are invariant even if the resource is limited on the frequency axis as shown in FIG. 19.

Since the method for transmitting the control channel is changed with the update of the group as a motive, there is a possible problem that the terminal for which the group is changed requires the handover every time. Therefore, it is desirable that the update of the group is made daily or once in a few hours, in which there is almost no traffic during the night, for example.

Though each remote radio unit comprises one antenna in the above explanation, the effects of the invention and this embodiment are invariant with the MIMO configuration.

In the configuration of the invention and this embodiment, one base band unit grasps the communication amount of the plural remote radio units and their correlation. Accordingly, it is easy to make the broadcast to share a neighbor list between the greatly correlated remote units. If the neighbor list can be automatically generated, the possibility of nonconformity caused by a human mistake is eliminated.

The invention is applicable to a system comprising a plurality of remote radio units in various forms such as SISO, SIMO, MISO and MIMO.

Also, with the invention, in the cellular communication, the setting of cell parameters is automated in a centralized base station for integrating a plurality of antennas, which can be kept in a highly efficient state at any time.

What is claimed is:

1. A radio base station apparatus, having one or more groups including part or all of a plurality of remote radio units having one or more antennas, for transmitting a down link channel signal including control information that is the same for each group, a reference signal specifying a radio terminal, and user data to any radio terminal via the plurality of remote radio units, and receiving an up link channel signal from any radio terminal via the plurality of remote radio units, the radio base station comprising:
- an analysis section for calculating a correlation matrix R representing the degree of interference between each of two remote radio units based on a received signal; and
- a processing section for performing grouping;

wherein
- the processing section checks the traffic on a control channel transmitted to each terminal, and obtains a total traffic Ti on the control channel for each remote radio unit i;
- the processing section transforms the correlation matrix R calculated in the analysis section to a partial orthogonal matrix R' subjected to partial orthogonalization;
- the processing section divides the remote radio units into the groups including the one or more remote radio units in accordance with the partial orthogonal matrix R';
- the processing section stores the identification number of the one or more remote radio units for each group in a memory, for performing the grouping;
- the processing section divides the remote radio units into a plurality of group candidates based on the diagonal elements of the partial orthogonal matrix R', and adds the total of traffic on the control channel for one or more remote radio units included in each divided group candidate to obtain the total traffic for each group candidate,
- the processing section compares the obtained total traffic for each group candidate with the predetermined threshold, and
- if the obtained total traffic is greater than or equal to the threshold, the processing section performs the grouping by further dividing the group candidate so that the total traffic may be smaller than the threshold.

2. The radio base station apparatus according to claim 1, wherein
the processing section divides the remote radio unit into plural groups based on the diagonal elements of the partial orthogonal matrix R', and adds the total of traffic on the control channel for one or more remote radio units included in each divided group to obtain the total traffic for each group,
the processing section compares the obtained total traffic for each group with the predetermined threshold,
in which if the total traffic of a certain group is greater than or equal to the threshold, the processing section performs the grouping by further dividing the group so that the total traffic may be smaller than the threshold,
while, if the total traffic of the certain group is smaller than the threshold, the processing section adds further one or more groups, or one or more remote radio units to the group to have the new group, and performs the grouping so that the total traffic of the new group may be smaller than the threshold.

3. The radio base station apparatus according to claim 1, wherein
the processing section performs the grouping by selecting the remote radio units one by one in accordance with the sequence of rows or columns of the partial orthogonal matrix R' to sequentially add the selected remote radio units to the group, adding the total of traffic for one or more remote radio units within the group to obtain the total traffic for each group, and adding one or more remote radio units to the group within the range where the total traffic does not exceed the predetermined threshold.

4. The radio base station apparatus according to claim 1, wherein
the processing section performs a first process for transforming the correlation matrix R so that the diagonal element having the maximum value may be placed at the upper left,
the processing section performs a second process for transforming the rows so that the (i+1)-th and following rows may be arranged in the descending order in view of the i-th column,
the processing section performs a third process for transforming the columns so that the (i+1)-th and following columns may be arranged in the descending order in view of the i-th row,
the processing section performs a fourth process for storing the replacement information indicating the correspondence of rows and/or columns of the remote radio units in a memory, and
the processing section obtains the partial orthogonal matrix R' by performing the first to fourth processes for all of the i rows and the i columns.

5. The radio base station apparatus according to claim 1, wherein the grouping is performed by update in units of time, day, day of week, week or month, in which the update time occurs when the traffic of the concerned remote radio unit becomes zero.

6. The radio base station apparatus according to claim 1, wherein the total Ti of traffic on the correlation matrix R or control channel is further subjected to the time averaging with the forgetting average.

7. The radio base station apparatus according to claim 1, wherein the analysis section
obtains the propagation path estimation information by multiplying a received signal $x_{i,k}(f)$ in the frequency domain by the complex conjugate of a reference signal or SRS $c_k(f)$ (where i is the identifier of the remote radio unit, and k is the identifier of the radio terminal),
obtains a delay profile $X_{i,k}(\tau)$ of the propagation path by making the inverse Fourier transformation for the obtained propagation path estimation information from the frequency domain to the time domain,
selects the path exceeding the threshold $Th_{i,k}$ from the obtained delay profile $X_{i,k}(\tau)$ to obtain the sum total $S_i(k)$ of the power, and
obtains a normalized index indicating the interference power that the terminal connected to one remote radio unit has on the other remote radio unit, with one terminal as a target, based on the sum total of the power.

8. The radio base station apparatus according to claim 1, wherein the analysis section makes the normalization by dividing the received power $S_j(k_i)$ when the signal transmitted by the radio terminal $k_i$ connected to the remote radio unit i is received by the other remote radio unit j by the received power $S_i(k_i)$ when the signal transmitted by the radio terminal k, is received by the remote radio unit i, so that the index of the terminal having great interference with the other remote radio unit is near one and the index of the terminal having no interference is near zero, and obtains the normalized index indicating the interference power.

9. The radio base station apparatus according to claim 1, wherein the analysis section
calculates an index $\Delta_{i,j}$ representing the degree of interference between two remote radio units by summing the sum total of normalized index indicating the interference power for all the terminals $k_i$ connected to one remote radio unit and the sum total of normalized index indicating the interference power on the one remote radio unit for the terminal $k_j$ connected to the other remote radio unit, based on the normalized index indicating the interference power,
obtains the correlation matrix R of which the element is each index $\Delta_{i,j}$ computed between the plural remote radio units, and
sends the obtained correlation matrix R to the processing section.

10. The radio base station apparatus according to claim 1, wherein the analysis section computes the threshold $Th_{i,k}$ by multiplying the sum total of all the received power by a fixed coefficient that is decided beforehand.

11. The radio base station apparatus according to claim 1, wherein,
in a downstream frame structure of the remote radio unit in the same group, the control channel has the same control information arranged even with the different remote radio unit, and the shared channel has the user data directed to the different terminals and the terminal reference signal arranged,
while, in a downstream frame structure of the remote radio unit in the different groups, the control channel has the different control information arranged, and the shared channel has the user data directed to the different terminals and the terminal reference signal arranged.

12. A radio base station apparatus, having one or more groups including part or all of a plurality of remote radio units having one or more antennas, for transmitting a down link channel signal including control information that is the same for each group, a reference signal specifying a radio terminal, and user data to any radio terminal via the plurality of remote radio units, and receiving an up link channel signal from any radio terminal via the plurality of remote radio units, the radio base station comprising:
an analysis section for calculating a correlation matrix R representing the degree of interference between each of two remote radio units based on a received signal; and
a processing section for performing grouping;
wherein
the processing section checks the traffic on a control channel transmitted to each terminal, and obtains the total traffic Ti on the control channel for each remote radio unit i;
the processing section transforms the correlation matrix R calculated in the analysis section to a partial orthogonal matrix R' subjected to partial orthogonalization;
the processing section divides the remote radio units into the groups including the one or more remote radio units in accordance with the sequence of rows or columns of the partial orthogonal matrix R' so that the total traffic for each group in which the total of traffic is added for one or more remote radio units within the group may be less than or equal to a predetermined threshold;
the processing section stores the identification number of the one or more remote radio units for each group in a memory, for performing the grouping;
the processing section divides the remote radio units into a plurality of group candidates based on the diagonal elements of the partial orthogonal matrix R', and adds the total of traffic on the control channel for one or more remote radio units included in each divided group candidate to obtain the total traffic for each group candidate,
the processing section compares the obtained total traffic for each group candidate with the predetermined threshold, and
if the obtained total traffic is greater than or equal to the threshold, the processing section performs the grouping by further dividing the group candidate so that the total traffic may be smaller than the threshold.

13. The radio base station apparatus according to claim 12, wherein
the processing section divides the remote radio unit into plural groups based on the diagonal elements of the partial orthogonal matrix R', and adds the total of traffic on the control channel for one or more remote radio units included in each divided group to obtain the total traffic for each group,
the processing section compares the obtained total traffic for each group with the predetermined threshold,
in which if the total traffic of a certain group is greater than or equal to the threshold, the processing section performs the grouping by further dividing the group so that the total traffic may be smaller than the threshold,
while, if the total traffic of the certain group is smaller than the threshold, the processing section adds further one or more groups, or one or more remote radio units to the group to have the new group, and performs the grouping so that the total traffic of the new group may be smaller than the threshold.

14. The radio base station apparatus according to claim 12, wherein
the processing section performs the grouping by selecting the remote radio units one by one in accordance with the sequence of rows or columns of the partial orthogonal matrix R' to sequentially add the selected remote radio units to the group, adding the total of traffic for one or more remote radio units within the group to obtain the total traffic for each group, and adding one or more remote radio units to the group within the range where the total traffic does not exceed the predetermined threshold.

15. The radio base station apparatus according to claim 12, wherein
the processing section performs a first process for transforming the correlation matrix R so that the diagonal element having the maximum value may be placed at the upper left,
the processing section performs a second process for transforming the rows so that the (i+1)-th and following rows may be arranged in the descending order in view of the i-th column,
the processing section performs a third process for transforming the columns so that the (i+1)-th and following columns may be arranged in the descending order in view of the i-th row,
the processing section performs a fourth process for storing the replacement information indicating the correspondence of rows and/or columns of the remote radio units in a memory, and
the processing section obtains the partial orthogonal matrix R' by performing the first to fourth processes for all of the i rows and the i columns.

16. The radio base station apparatus according to claim 12, wherein the analysis section obtains the propagation path estimation information by multiplying a received signal $x_{i,k}(f)$ in the frequency domain by the complex conjugate of a reference signal or SRS $c_k(f)$ (where i is the identifier of the remote radio unit, and k is the identifier of the radio terminal), obtains a delay profile $X_{i,k}(\tau)$ of the propagation path by making the inverse Fourier transformation for the obtained propagation path estimation information from the frequency domain to the time domain, selects the path exceeding the threshold $Th_{i,k}$ from the obtained delay profile $X_{i,k}(\tau)$ to obtain the sum total $S_i(k)$ of the power, and obtains a normalized index indicating the interference power that the terminal connected to one remote radio unit has on the other remote radio unit, with one terminal as a target, based on the sum total of the power.

17. The radio base station apparatus according to claim 12, wherein the analysis section makes the normalization by dividing the received power $S_j(k_i)$ when the signal transmitted by the radio terminal $k_i$ connected to the remote radio unit i is received by the other remote radio unit j by the received power $S_i(k_i)$ when the signal transmitted by the radio terminal $k_i$ is received by the remote radio unit i, so that the index of the terminal having great interference with the other remote radio unit is near one and the index of the terminal having no interference is near zero, and obtains the normalized index indicating the interference power.

18. The radio base station apparatus according to claim 12, wherein the analysis section calculates an index $\Delta_{i,j}$ representing the degree of interference between two remote radio units by summing the sum total of normalized index indicating the interference power for all the terminals $k_i$ connected to one remote radio unit and the sum total of normalized index indicating the interference power on the one remote radio unit for the terminal $k_j$ connected to the other remote radio unit, based on the normalized index indicating the interference power, obtains the correlation matrix R of which the element is each index $\Delta_{i,j}$ computed between the plural remote radio units, and sends the obtained correlation matrix R to the processing section.

* * * * *